(12) United States Patent
Fischer et al.

(10) Patent No.: US 7,025,586 B2
(45) Date of Patent: Apr. 11, 2006

(54) VALVE PIN GUIDANCE AND ALIGNMENT SYSTEM FOR AN INJECTION MOLDING APPARATUS

(75) Inventors: Jonathon Fischer, Oakville (CA); Denis Babin, Georgetown (CA)

(73) Assignee: Mold-Masters Limited, Georgetown (CA)

( * ) Notice: Subject to any disclaimer, the term of this patent is extended or adjusted under 35 U.S.C. 154(b) by 126 days.

(21) Appl. No.: 10/629,699

(22) Filed: Jul. 30, 2003

(65) Prior Publication Data

US 2004/0071817 A1 Apr. 15, 2004

Related U.S. Application Data

(60) Provisional application No. 60/399,121, filed on Jul. 30, 2002.

(51) Int. Cl.
*B29C 45/23* (2006.01)

(52) U.S. Cl. .................. 425/564; 425/566

(58) Field of Classification Search ........... 425/562, 425/563, 564, 565, 566
See application file for complete search history.

(56) References Cited

U.S. PATENT DOCUMENTS

| | | | |
|---|---|---|---|
| 2,865,050 A | 12/1958 | Strauss | |
| 3,488,810 A | 1/1970 | Gellert | |
| 3,716,318 A | 2/1973 | Erik et al. | |
| 3,741,704 A | 6/1973 | Beasley | |
| 3,952,927 A | 4/1976 | Schaumburg et al. | |
| 4,004,871 A | 1/1977 | Hardy | |
| 4,013,393 A | 3/1977 | Gellert | |
| 4,043,740 A | 8/1977 | Gellert | |
| 4,306,852 A | 12/1981 | Mateev et al. | |
| 4,652,230 A | 3/1987 | Osuna-Diaz | |
| 4,771,164 A | 9/1988 | Gellert | |
| 4,781,572 A | 11/1988 | Boring | |
| 4,911,636 A | 3/1990 | Gellert | |
| 4,945,630 A | 8/1990 | Gellert | |
| 5,053,271 A | 10/1991 | Mori et al. | |
| 5,299,928 A | 4/1994 | Gellert | |
| 5,334,008 A | 8/1994 | Gellert | |
| 5,421,716 A | 6/1995 | Gellert | |

(Continued)

FOREIGN PATENT DOCUMENTS

DE  3245571 A1  6/1984

(Continued)

OTHER PUBLICATIONS

PCT Search for PCT/CA03/01154 dated Dec. 3, 2004.

(Continued)

*Primary Examiner*—Tim Heitbrink
(74) *Attorney, Agent, or Firm*—Sterne, Kessler, Goldstein & Fox P.L.L.C.

(57) ABSTRACT

An injection molding apparatus includes a nozzle body, a valve pin, a nozzle tip, a seal piece, and a mold gate insert. The nozzle body has a melt channel. The valve pin is at least partially positioned in the melt channel. The valve pin has a first guidance and alignment structure thereon. The nozzle tip is connected to the nozzle body. The seal piece is connected to the nozzle body. The mold gate insert defines a gate and is in contact with the seal piece. The nozzle tip has a higher thermal conductivity than the nozzle body. The seal piece has a lower thermal conductivity than the nozzle body. The mold gate insert has a higher thermal conductivity than the seal piece. The mold gate insert includes a second guidance and alignment structure thereon that contacts the first guidance and alignment structure before the valve pin contacts the gate.

35 Claims, 19 Drawing Sheets

U.S. PATENT DOCUMENTS

| | | | |
|---|---|---|---|
| 5,505,613 A | 4/1996 | Krummenacher | |
| 5,545,028 A | 8/1996 | Hume et al. | |
| 5,695,793 A | 12/1997 | Bauer | |
| 5,700,499 A | 12/1997 | Bauer | |
| 5,811,140 A | 9/1998 | Manner | |
| 5,834,041 A | 11/1998 | Sekine et al. | |
| 5,849,343 A | 12/1998 | Gellert et al. | |
| 5,895,669 A * | 4/1999 | Seres et al. | 425/549 |
| 5,955,121 A | 9/1999 | Gellert et al. | |
| 6,030,202 A | 2/2000 | Gellert et al. | |
| 6,036,467 A * | 3/2000 | Jameson | 425/564 |
| 6,050,806 A | 4/2000 | Ko | |
| 6,089,468 A | 7/2000 | Bouti | |
| 6,273,706 B1 | 8/2001 | Gunther | |
| 6,309,208 B1 | 10/2001 | Kazmer et al. | |
| 6,358,038 B1 | 3/2002 | Rozenberg | |
| 6,358,039 B1 | 3/2002 | Manner et al. | |
| 6,419,116 B1 | 7/2002 | Eigler et al. | |
| 6,769,901 B1 | 8/2004 | Babin et al. | |
| 6,789,745 B1 | 9/2004 | Babin et al. | |
| 6,869,276 B1 | 3/2005 | Babin et al. | |
| 6,921,257 B1 | 7/2005 | Olaru | |
| 6,921,259 B1 * | 7/2005 | Sicilia et al. | 425/562 |
| 2003/0008034 A1 | 1/2003 | Niewels | |
| 2003/0118688 A1 | 6/2003 | Bazzo et al. | |
| 2003/0170340 A1 | 9/2003 | Sicilia et al. | |
| 2003/0235638 A1 | 12/2003 | Gellert | |
| 2004/0131721 A1 | 7/2004 | Babin et al. | |
| 2004/0137107 A1 | 7/2004 | Babin et al. | |
| 2004/0146598 A1 | 7/2004 | Sicilia et al. | |
| 2004/0265417 A1 | 12/2004 | Olaru | |
| 2005/0106283 A1 | 5/2005 | Olaru | |
| 2005/0136151 A1 | 6/2005 | Babin | |

FOREIGN PATENT DOCUMENTS

| | | |
|---|---|---|
| DE | 29602484 | 9/1996 |
| DE | 19608676 | 1/1997 |
| EP | 0638407 | 2/1995 |
| EP | 0750975 | 1/1997 |
| EP | 0873841 | 10/1998 |
| EP | 0962296 A2 | 8/1999 |
| EP | 1188537 A2 | 3/2002 |
| EP | 1 321 274 A1 | 6/2003 |
| FR | 2537497 | 6/1984 |
| JP | 05-261770 | 3/1992 |
| JP | 05-177664 | 7/1993 |
| JP | 05-309695 | 11/1993 |
| JP | 7-148786 | 6/1995 |
| JP | 8-90598 | 4/1996 |
| JP | 10-264222 | 10/1998 |
| JP | 11-254488 | 9/1999 |
| JP | 2002-307492 | 10/2002 |
| JP | 2003-11173 | 1/2003 |
| JP | 2003-11174 | 1/2003 |
| JP | 2003-11176 | 1/2003 |
| WO | WO 84/00922 | 3/1984 |
| WO | WO 01/78961 | 10/2001 |
| WO | WO 03/04243 | 1/2003 |
| WO | WO 03/70446 | 8/2003 |
| WO | WO 2004/12923 | 2/2004 |

OTHER PUBLICATIONS

H.P. Manner, "Nadelverschlußdusen fur kurze Zykluszeit," Kunststoffe 85(2): 166-168(1995).

Images and information from "Gunther Hot Runner Technology," taken from Gunther website Aug. 2003.

Redacted letter and attached figure addressed to Mold Masters Limited from the representative of Mr. Maurizio Bazzo dated Dec. 21, 2001.

U.S. Appl. No. 11/135,525, filed May 24, 2005, Olaru.

* cited by examiner

VALVE PIN GUIDANCE AND ALIGNMENT SYSTEM FOR AN INJECTION MOLDING APPARATUS

FIELD OF THE INVENTION

This invention relates to an injection molding apparatus, and more particularly to a valve pin guidance and alignment system for a valve pin on an injection molding apparatus.

BACKGROUND OF THE INVENTION

It is known for a nozzle in hot runner injection molding apparatuses to include a valve pin gating mechanism at each gate into each mold cavity. The valve pin is typically moved in a melt channel of the nozzle towards or away from the gate, to control the flow of melt into the melt cavity. In order to provide a good seal at the gate, both the tip portion of the valve pin and the corresponding sealing surface on the gate must typically be machined to very close tolerances Due to a variety of reasons, however, the tip of the valve pin may be misaligned with the gate as it enters the gate. For example, the nozzle in which the valve pin moves may be misaligned with the gate. Also, thermal expansion and contraction of the components of the injection molding apparatus, which takes place repeatedly during an injection molding campaign can cause components to shift, ultimately resulting in misalignment of the nozzle and valve pin with the gate. Non-homogeneity in the melt itself can cause the melt to exert uneven fluid pressure on the valve pin body, which can push the sealing end of the valve pin out of alignment with the gate.

When a misaligned valve pin is moved to close a gate, the valve pin collides with the gate and can cause scoring of the sealing surfaces on the valve pin and/or the gate. This can ultimately result in poor quality parts with blemishes around the gate, and can cause other problems with the molding operation. Furthermore, a damaged valve pin or gate can be expensive and time consuming to replace. The damage may happen immediately, or alternatively it may happen gradually, over many cycles of opening and closing the valve pin.

Solutions that have been proposed for this problem, have typically included a guide means positioned towards the bottom of the nozzle melt channel to capture and align the free end of the valve pin. Because melt is required to flow past the alignment means/valve pin interface when the valve pin is in the open position, a plurality of circumferentially spaced slots are typically provided in either the valve pin or the alignment means. These slots create the potential for weld lines to appear in the molded product, as a result of the melt flow in the nozzle melt channel separating to pass around the guide means, and subsequently reuniting downstream from the guide means. Furthermore, the presence of such guide means in the nozzle melt channel typically renders more difficult a cleanout of the nozzle melt channel, hampering for example the changeover of a machine to run a new melt.

Other solutions have provided an offset nozzle melt channel which has a main portion that is offset from the center of the nozzle, and a lowermost portion that is aligned with the gate. The valve pin passes through the nozzle body and extends only into the lowermost portion of the nozzle melt channel. In this way, the valve pin is captured along a substantial portion of its length, which makes it less susceptible to misalignment. However, because a substantial portion of the nozzle melt channel is offset from the center of the nozzle, the heat distributed to the melt flowing therethrough is uneven, which can cause difficulties in controlling melt temperature. Reference is made to U.S. Pat. No. 5,834,041 (Sekine et al) and U.S. Pat. No. 5,895,669 (Seres, Jr et al), which disclose embodiments of this genre of proposed solution.

Other problems also exist, which originate from the manufacture of the nozzles themselves instead from the properties of the melt flow. Manufacturing errors may exist in the nozzles, which can introduce a misalignment between the valve pin and the gate that is 'built-in'. The guide means that are described above, which are built into the nozzle itself, do nothing to correct this particular cause of misalignment.

Another issue relating to the valve pin has to do with the heat transfer characteristics of the nozzle and the mold plate. Typically, a space exists between the downstream end of a nozzle and the gate of the mold plate. The space is defined in part by the mold plate and in part by components of the nozzle. The space typically fills with melt at the beginning of an injection molding campaign. In some configurations of nozzle and mold plate, the melt in the space solidifies as a result of the combined effects of cooling from the mold plate, and insufficient heat transfer from the nozzle components. In some circumstances the solidified melt in the space can extend into the path taken by the valve pin towards the gate in the mold plate. Thus, in those circumstances, during movement of the valve pin towards the gate, the valve pin contacts the solidified melt in the space. The contact with the solidified melt can push the leading edge of the valve pin out of alignment with the gate. Furthermore, the solidified melt can cause wear on the leading edge of the valve pin, particularly if the melt is a glass-filled plastic or is some other abrasive material. Thus, it is possible for the valve pin to incur wear on its leading edge and sealing surfaces even when it is in perfect alignment, depending on the thermal characteristics of the molding operation and the material being injected.

Thus, a need exists for an injection molding apparatus that provides improved guiding of the valve pin towards the gate.

SUMMARY OF THE INVENTION

In a first aspect, the invention is directed to an injection molding apparatus comprising a manifold, a nozzle, a mold block, a valve pin, a first guidance and alignment structure, and a second guidance and alignment structure. The manifold has an inlet for receiving melt from a melt source. The manifold defines a runner that is downstream from the inlet and upstream from a manifold outlet. The nozzle defines a nozzle melt channel. The nozzle melt channel is downstream from the manifold outlet. The nozzle includes a nozzle body, a nozzle tip, a sealed piece, and a heater thermally connected to the nozzle body for heating melt in the nozzle melt channel. The nozzle tip and the seal piece are connected with respect to the nozzle body. The nozzle tip defines a portion of the nozzle melt channel. The thermal conductivity of the nozzle tip is higher than the thermal conductivity of the nozzle body. The thermal conductivity of the seal piece is lower than the thermal conductivity of the nozzle body. The mold block defines a mold cavity. The mold block defines a gate into the mold cavity. The gate is downstream from the nozzle melt channel. The gate includes a gate sealing surface. The mold block has at least one cooling channel therein for conveying a coolant therethrough for cooling the mold cavity. The mold block and the seal piece engage each other to inhibit melt leakage therebetween. A chamber is defined between the mold block, the nozzle tip, and the seal piece. The chamber is positioned downstream from the nozzle melt passage and upstream from the gate. The nozzle tip has sufficient surface area in the chamber to maintain melt in the chamber in a substantially molten state. The valve pin is movable into and out of the gate to control melt flow through the gate. The valve pin has a bottom end. The valve pin has a valve pin sealing surface proximate the bottom end. The valve pin sealing surface is engageable with the gate sealing surface to inhibit melt flow into the mold cavity. The first guidance and alignment structure is connected to the valve pin. The first guidance and alignment structure includes a first guide surface and first alignment surface. The first guide surface has a cross-sectional diameter that decreases gradually in a downstream direction. The first alignment surface is generally cylindrical. The first guide surface is positioned immediately downstream from the first alignment surface. The second guidance and alignment structure is connected to the mold block upstream from the gate. The second guidance and alignment structure includes a second guide surface and a second alignment surface. The second guide surface has a diameter that decreases gradually in a downstream direction. The second alignment surface is generally cylindrical. The second guide surface is positioned immediately upstream from the second alignment surface. The second guide surface is positioned to engage the first guide surface to slide the valve pin into alignment with the gate when the valve pin is misaligned with the gate during movement of the value pin towards the gate. The second guide surface is positioned to complete alignment of the valve pin with the gate prior to contact between the valve pin and the gate. The second alignment surface is positioned to engage the first alignment surface to maintain the valve pin in alignment with the gate during movement of the valve pin towards the gate.

In a second aspect, the invention is directed to an injection molding apparatus, comprising a nozzle body, a valve pin, a nozzle tip, a seal piece, and a mold gate insert. The nozzle body has a melt channel and is made of a first material. The valve pin is at least partially positioned in the melt channel. The valve pin has a first guidance and alignment structure thereon. The nozzle tip is connected to the nozzle body. The seal piece is connected to the nozzle body. The mold gate insert has a gate. The mold gate insert is in contact with the seal piece. The nozzle tip is made of a second material having a higher thermal conductivity than the first material. The seal piece is made of a third material having a lower thermal conductivity than the first material. The mold gate insert is made of a fourth material having a higher thermal conductivity than the third material. The mold gate insert includes a second guidance and alignment structure thereon that contacts the first guidance and alignment structure before the valve pin contacts the gate.

In a third aspect, the invention is directed to a method of guiding a valve pin for an injection molding apparatus into engagement with a gate of said molding apparatus comprising:

providing a first guide surface on said valve pin adjacent to but upstream from the sealing surface of said pin and a second guide surface on said molding apparatus adjacent to but upstream from said gate;

providing a first alignment surface on said valve pin adjacent to but upstream from the sealing surface of said pin and a second alignment surface on said molding apparatus adjacent to but upstream from said gate; and guiding said valve pin as said pin moves downstream towards said gate by interaction of said first and second guide surfaces and interaction of said first and second alignment surfaces before said pin closes said gate.

DESCRIPTION OF THE DRAWINGS

For a better understanding of the present invention and to show more clearly how it may be carried into effect, reference will now be made by way of example to the accompanying drawings, in which.

DESCRIPTION OF THE PREFERRED EMBODIMENT

Figure 1:
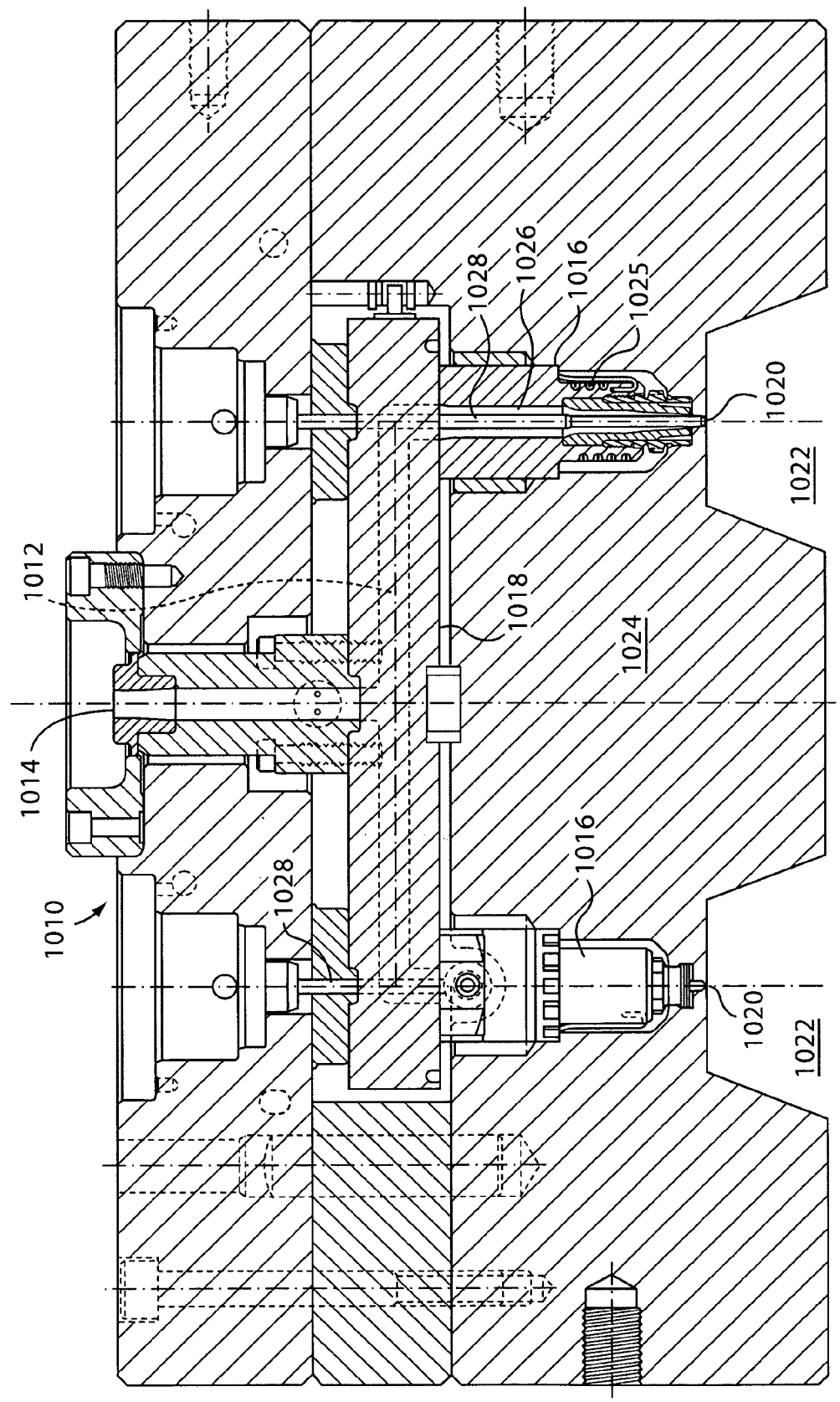
FIG. 1 is a sectional view of an injection molding apparatus of the prior art.

Reference is made to FIG. 1, which shows an injection molding apparatus 1010 of the prior art. The injection molding apparatus 1010 includes one or more runners 1012, that transfer melt from an inlet 1014 to one or more nozzles 1016. The runners 1012 are defined within one or more molding apparatus plates, such as, for example, a manifold 1018. The inlet 1014 is adapted to be fluidly connected to a melt source (not shown).

The nozzles 1016 transfer melt from the runners 1012 through one or more gates 1020 and into one or more mold cavities 1022 defined in a mold plate 1024. A heater 1025 may heat each nozzle 1016. Each nozzle 1016 defines a nozzle melt channel 1026 which is in fluid communication with a runner 1012 and thus, with the melt source.

A valve pin 1028 is movable within each nozzle melt channel 1026 to open and close one of the gates 1020, permitting or restricting the flow of melt into the mold cavity 1022. The configuration of the end portion of the valve pin 1028 and the gate 1020 and their engagement are shown in more detail in FIGS. 2a, 2b, 2c and 2d. The valve pin 1028 typically includes a generally cylindrical body 1030, a cylindrical sealing surface 1031, which is typically on the endmost portion of the body 1030, and an end face 1032. The edge between the end face 1032 and the sealing surface 1031 is shown at 1034 and is typically chamfered to facilitate the introduction of the valve pin 1028 into the gate 1020.

Due to the fact that the end face 1032 and chamfered edge 1034 will ultimately make up a portion of the surface of the mold cavity 1022, there may be design restrictions on the angle of the chamfered edge 1034. For example, the chamfered edge 1034 may be limited to having a relatively shallow angle with respect to the end face 1032 so as to provide a certain shape in the molded part.

The gate 1020 typically includes a cylindrical sealing surface 1036 adjacent the mold cavity 1022, and also includes a lead-in surface 1038 that is chamfered. The sealing surface 1036 receives and cooperates with the sealing surface 1031 of the valve pin 1028 to seal the gate 1020 against melt flow into the mold cavity 1022. The lead-in surface 1038 cooperates with the chamfered edge 1034 on the valve pin 1028 to facilitate the introduction of the valve pin 1028 into the gate 1020.

Figure 2A:
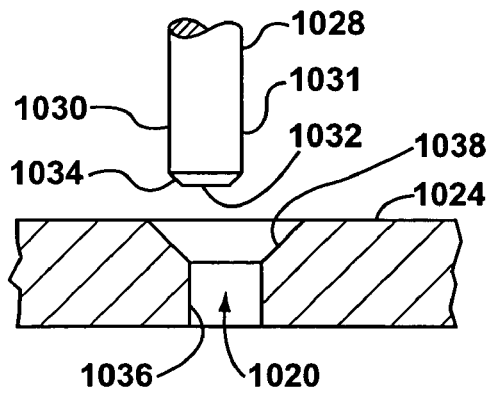
FIGS. 2a, 2b, 2c and 2d are magnified sectional side views showing the operation of a valve pin and mold plate of the prior art.
Figure 2B:
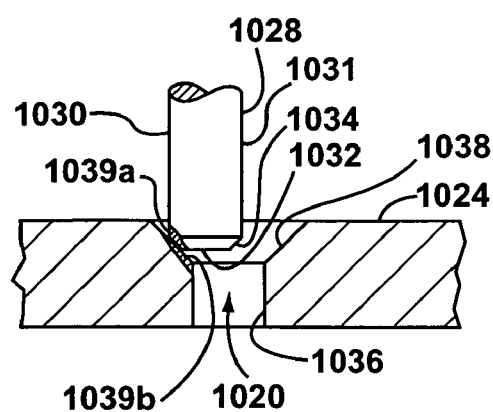
Figure 2C:
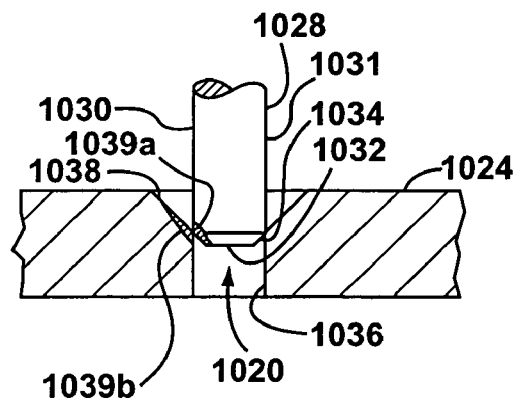
Figure 2D:
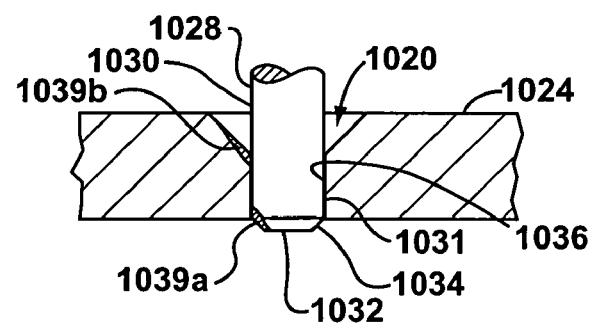

The movement of the valve pin 1028 will now be described. In FIG. 2a, the valve pin 1028 is shown spaced from the gate 1020. The valve pin 1028 may be misaligned with the gate 1020 to any degree. When the valve pin 1028 is moved to close the gate 1020, if there is any misalignment of the valve pin 1028 and gate 1020, the valve pin 1028 first contacts the gate 1020 in the manner shown in FIG. 2b. The first contact is made by the chamfered edge 1034 and the lead-in surface 1038. As the valve pin 1028 moves forward to close the gate 1020, the chamfered edge 1034 slides off the lead-in surface 1038 thereby guiding the valve pin 1028 into alignment with the gate 1020. The valve pin 1028 then moves forwardly in the sealing surface 1036 of the gate 1020, as shown in FIG. 2c until arriving at the 'closed' position, as shown in FIG. 2d. It will be appreciated that the 'closed' position of the valve pin 1028 need not be as shown in FIG. 2d. After a number of molding cycles, the repeated contact between the valve pin 1028 and the inlet surface 1036 of the gate 1020 can eventually result in one or both of the sealing surface 1031 of the valve pin 1028 and the sealing surface 1036 of the gate 1020 being scored, worn away or otherwise damaged.

The portions of the valve pin 1028 and the gate 1020 that can be damaged are shown at 1039a and 1039b respectively. This damage can result in melt leaking past the gate 1020 after the gate 1020 is closed, and can also result in blemishes on the molded part. Thus, depending on the needs of the molding operation, the valve pin 1028 and the gate 1020 may require repair of replacement. It will be noted that the scoring or damage shown at 1039a and 1039b can occur almost immediately, depending on the nature of the molding operation, and thus poor quality parts can result virtually immediately. This problem is exacerbated if the angle of the chamfered edge 1034 on the valve pin 1028 is shallow, because the contact forces between the valve pin 1028 and the lead-in surface 1038 can further promote wear, scoring or other damage.

Figure 3:
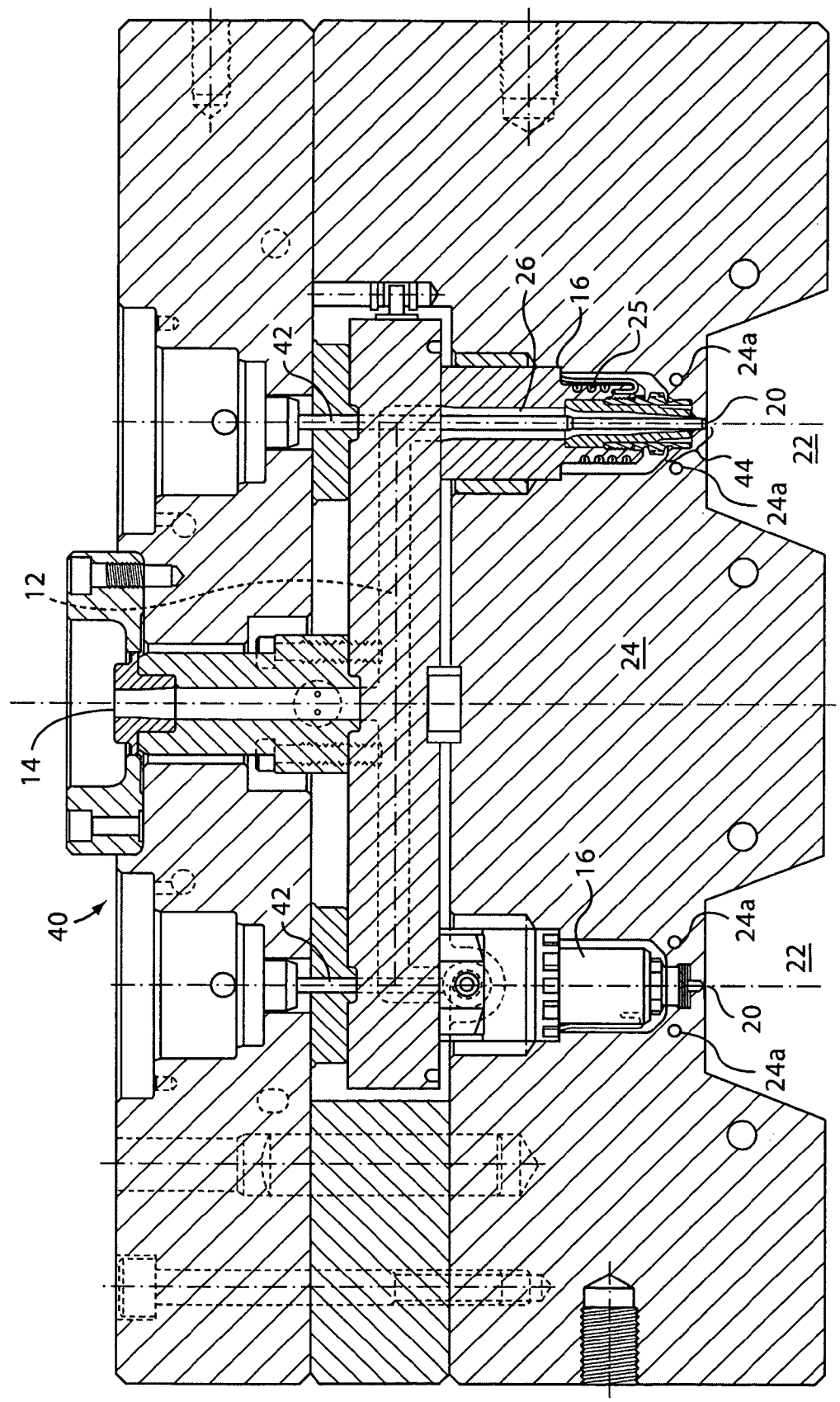
FIG. 3 is a sectional view of an injection molding apparatus having a plurality of valve pin guidance and alignment systems in accordance with a first embodiment of the present invention.

Reference is made to FIG. 3, which shows an injection molding apparatus 40, in accordance with a first embodiment of the present invention. The injection molding apparatus 40 may be any suitable type of injection molding apparatus, and may be generally similar to the injection molding apparatus 1010, except that the injection molding apparatus 40 includes a valve pin 42 and a guidance and alignment system 44. The valve pin guidance and alignment system 44 prolongs the life of the valve pin 42 and gate 20 by reducing or eliminating contact between the valve pin 42 and gate 20 during closure of the gate 20, and by reducing wear on the valve pin 42 as a result of contact with solidified melt, which can be abrasive.

The injection molding apparatus 40 includes one or more runners 12, that transfer melt from an inlet 14 to one or more nozzles 16. The runners 12 are defined within one or more molding apparatus plates, such as, for example, a manifold 18. The inlet 14 is adapted to be fluidly connected to a melt source (not shown).

The nozzles 16 transfer melt from the runners 12 through one or more gates 20 and into one or more mold cavities 22 defined in a mold block 24. A plurality of cooling channels 24a are shown in the mold block 24. The mold block may be made from any suitably thermally conductive material, such as mold steel.

A heater 25 may heat each nozzle 16, and a thermocouple 25a may be used to sense the temperature of the nozzle 16. Each nozzle 16 defines a nozzle melt channel 26 which is in fluid communication with one of the runners 12 and thus, with the melt source.

On of the valve pins 42 is movable within each nozzle melt channel 26 to open and close one of the gates 20, permitting or restricting the flow of melt into one of the mold cavities 22.

Reference is made to FIGS. 4a, 4b, 4c and 4d, which show the configuration of the end portion of valve pin 42, the valve pin guidance and alignment system 44 and the gate 20. The valve pin 42 includes a body 46, a sealing surface 48, an end face 50 and a first guidance and alignment structure 52. The body 46 may have any suitable shape, such as generally cylindrical. The sealing surface 48 may be similar to the sealing surface 1031 on the valve pin 1028 in FIGS. 2*a*–2*d*, and cooperates with the sealing surface 36 of the gate 20 to close the gate 20.

The first guidance and alignment structure 52 is positioned between the body 46 and the sealing surface 48, and includes a first tapered guide surface 54 and a first alignment surface 56. The first tapered guide surface 54 and first alignment surface 56 cooperate with a second tapered guide surface 58 and a second alignment surface 60 on a second guidance and alignment structure 62, to bring the valve pin 42 into alignment with the gate 20.

Figure 4A:
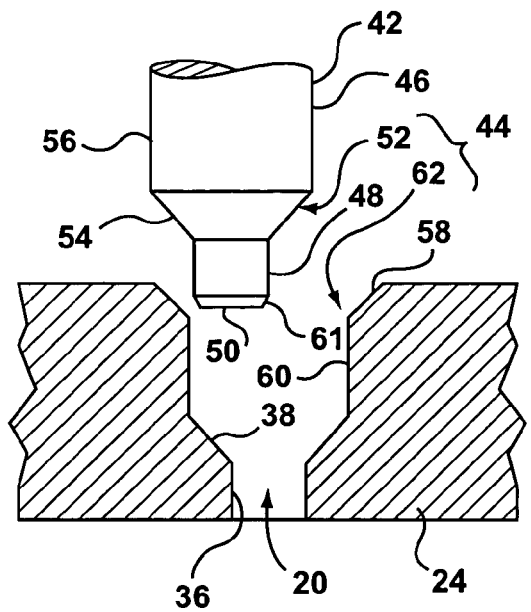
FIGS. 4a, 4b, 4c and 4d are magnified sectional side views of the valve pin guidance and alignment system shown in FIG. 3.
Figure 4B:
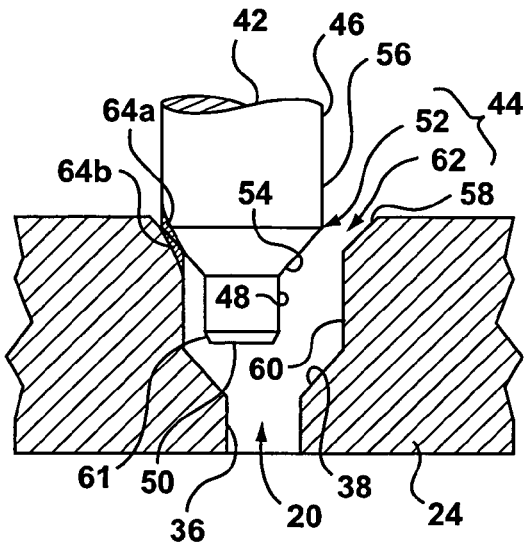
Figure 4C:
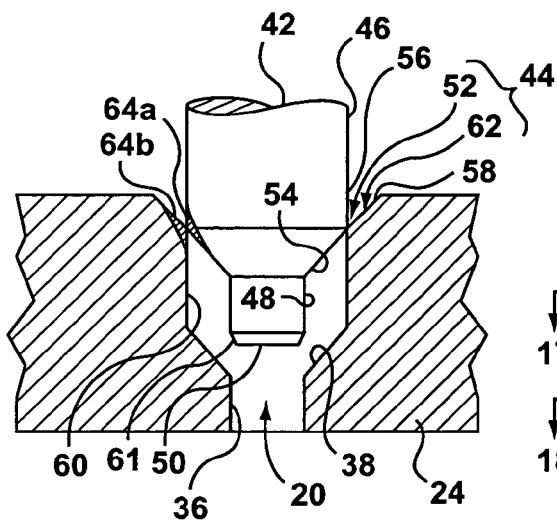

As the valve pin 42 moves from the position shown in FIG. 4*a* towards the gate 20, if there is any misalignment between the valve pin 42 and the gate 20, the first contact made occurs between the first and second guide surfaces 54 and 58, as shown in FIG. 4*b*. The first and second guide surfaces 54 and 58 may be provided with any selected angle of taper. Thus, the taper angles, which are shown at Θ1 and Θ2 respectively, can be selected to reduce the risk of scoring or otherwise damaging one or both guide surfaces 54 and 58 upon first contact or upon any subsequent sliding contact.

It will be noted that the guide surfaces 54 and 58 and the alignment surfaces 56 and 60 on the first and second structures 52 and 62 have a larger diameter than the surfaces 1036, 1038, 1034 and 1031 on the gate 1020 and valve pin 1028 of FIGS. 2*a*–2*d*. By having the contact and sliding occur on these larger diameter surfaces 54, 58, 56 and 60, the first and second structures 52 and 62 are adapted to have a longer service life before requiring repair or replacement, relative to the smaller diameter surfaces 1036, 1038, 1034 and 1031 of FIGS. 2*a*–2*d*.

One or both of the first and second guide surfaces 54 and 58 may be hardened by any suitable surface treatment means, to further reduce the risk of scoring. One of the first and second guide surfaces 54 and 58 may be selected to be harder than the other, so that the softer of the two may be 'sacrificed' during the repeated contacting and sliding that occurs during an injection molding campaign. The surface 54 or 58 that is selected to be sacrificed may be, for example, on the part that is the less expensive of the two, the easier of the two or the less time consuming of the two to replace.

Figure 4D:
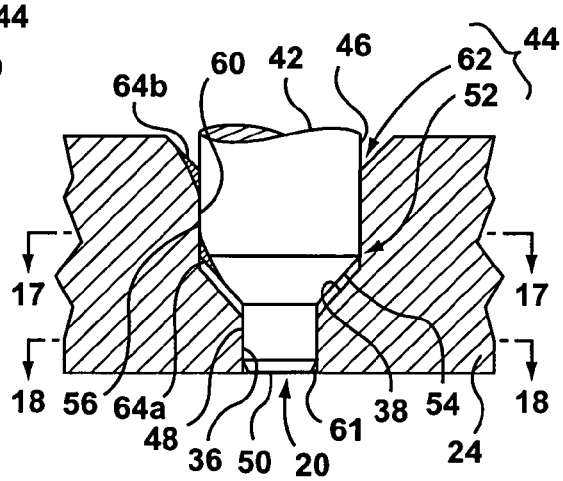

As the valve pin 42 is moved towards the gate 20, the first and second guide surfaces 54 and 58 cooperate to bring the valve pin 42 into alignment with the gate 20. Once the first guide surface 54 is moved past the second guide surface 58, the first and second alignment surfaces 56 and 60 contact each other to maintain the valve pin 42 in alignment with the gate 20. The valve pin 42 is then moved towards and into the gate 20, to close the gate 20, as shown in FIG. 4*d*.

The first and second alignment surfaces 56 and 60 may be surface treated in a similar way to the first and second guide surfaces 54 and 58, and may also include one surface 56 or 60 that is selected to be sacrificial.

It will be noted that, because the valve pin 42 is aligned with the gate 20 before entering the gate 20, a chamfered edge is not required between the end face 50 and the sealing portion 48. By not chamfering the edge, it is possible to virtually eliminate any blemishes on the molded part, by moving the valve pin 42 into the gate 20 so that the end face 50 is flush with the interior surface of the mold cavity 22.

Nonetheless, a chamfered edge may be included optionally, and is shown at 61. The chamfered edge 61 may, however, have any suitable shape as desired to meet the aesthetic requirements of the molded part, with no effect on the ability of the valve pin 42 to enter and close the gate 20.

The portions of the components shown in FIGS. 4*a*–4*d*, that incur wear and damage are shown at 64*a* and 64*b*, and are positioned away from the sealing surfaces 48 and 36. Thus, by incorporating the first and second guidance and alignment structures 52 and 62, the service life of the valve pin 42 may be extended beyond the service life of the valve pin 28. Furthermore, since damage from misalignment is reduced or eliminated, blemishes that occur on the molded parts as a result of the damage are reduced or eliminated.

Together, the first and second guidance and alignment structures 52 and 62 make up the valve pin guidance and alignment system 44. It has been shown for the first and second guidance and alignment structures 52 and 62 to be integrally incorporated into the valve pin 42 and the mold block 24, the structures 52 and 62 may be made as separate pieces, which may be joined to the valve pin 42 and mold block 24 by any suitable means. For example, referring to FIG. 5, the first structure 52 may be made as a ring that includes a threaded portion 66, which mates with a corresponding threaded portion 68 on the valve pin 42. By making the structure 52 as a separate piece that is removable from the valve pin 42, the structure 52 may more easily be made from any suitable material having any desired mechanical properties. The structure 52 may be made to be hard and to resist wear, or alternatively, the structure 52 may be made to be soft, if, for example, the structure 52 is selected to be sacrificial, as described above. The first structure may also include a tool engaging surface 69 for installation and removal of the first structure 52 from the valve pin 42.

In a similar fashion to the structure 52, the structure 62 may be made as a separate piece, such as a ring and may be made to be removably connectable to the mold block 24 by means of mating threaded portions 70 and 72 on the structure 62 and the mold block 24 respectively. The second structure may also include a raised tool engaging surface 73 for installation and removal of the second structure 62 from the mold block 24. As a separate, removably attachable piece, the mechanical properties of the second structure 62 may be selected as desired.

Referring to all embodiments, the second structure 62 must be positioned far enough away from the gate 20, so that the valve pin 42 is aligned by the cooperation of the first and second guide surfaces 54 and 58 before any portion of the valve pin 42 contacts the gate 20. With deference to the condition above, it is however advantageous for the second structure 62 to be positioned as close as possible to the gate 20, to reduce the risk of the end of the valve pin 42 becoming misaligned again after being aligned by the second structure 62. Such misalignment can occur again, for example, due to non-homogeneity in the melt downstream from the second structure 62.

Figure 17:
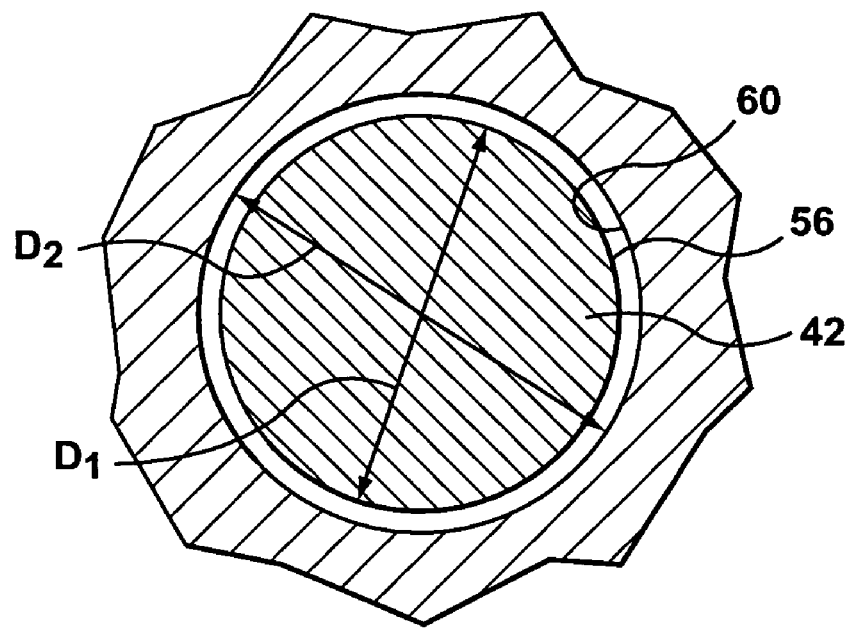
FIG. 17 is a magnified sectional view through section 17—17 of FIG. 4d.

Reference is made to FIG. 17, which shows a magnified sectional view of the first and second alignment surfaces 56 and 60 In FIG. 17, the valve pin 42 is shown as being centered perfectly within the cylindrical alignment surface 60. The diameter of the first alignment surface is shown as D1. The diameter of the second alignment surface 60 is shown at D2.

Figure 18:
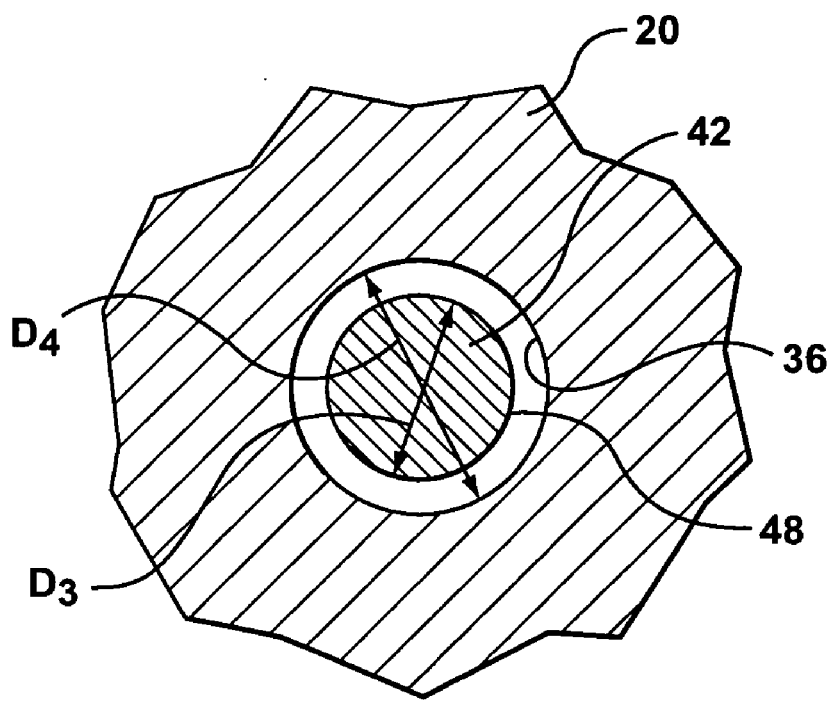
FIG. 18 is a magnified sectional view through section 18—18 of FIG. 4d.

Reference is made to FIG. 18, which shows a magnified sectional view of the valve pin sealing surface 48 and the gate sealing surface 36. In FIG. 18, the valve pin 42 is shown as being centered perfectly within the cylindrical gate sealing surface 36. The diameter of the valve pin sealing surface 48 is shown as D3. The diameter of the gate sealing surface 36 is shown as D4.

Referring to FIGS. 17 and 18 together, it is preferable that the valve pin 42 and the gate 20 and the second guidance and alignment structure 62 are manufactured so that the difference between D1 and D2 is less than the difference between D3 and D4. To achieve this, the tolerances on the first and second alignment surfaces 56 and 60 may need to be tighter than the tolerances on the valve pin sealing surface 48 and the gate sealing surface 36. By providing a smaller diameter difference on the first and second alignment surfaces 56 and 60 than on the sealing surfaces 48 and 36, the valve pin 42 is ensured to be aligned for a collision-free entry with the gate 20. Even if the valve pin 42 were so far out of alignment that the alignment surfaces 56 and 60 were in contact with each other, the end face 50 (see FIG. 4d) would be assured of entering collision-free into the gate 20. In effect, the diameter difference between D1 and D2 (see FIG. 17) at least in part limits the amount that the valve pin 42 can be off from being in perfect alignment with the gate 20 (see FIG. 4c).

Figure 6:
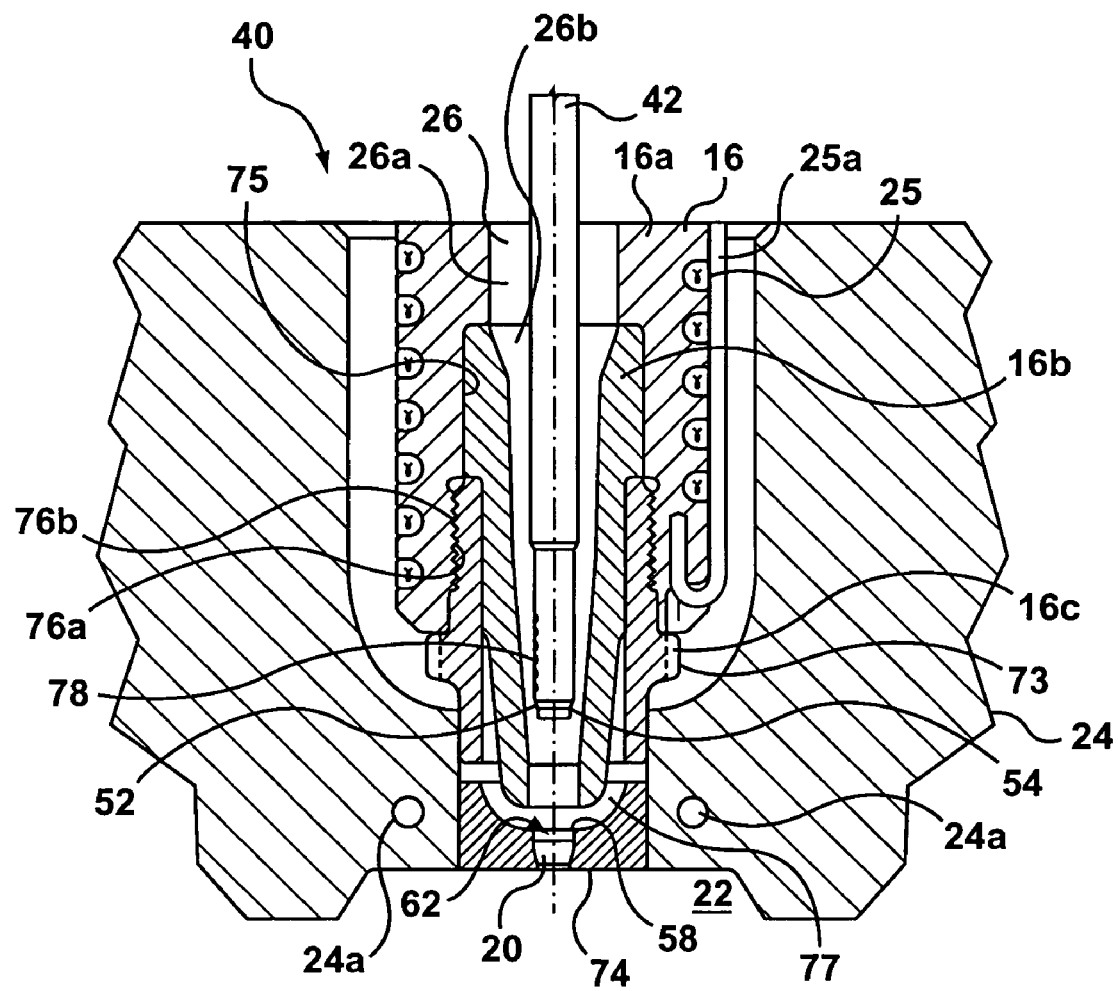
FIG. 6 is a sectional side view of a portion of the injection molding apparatus shown in FIG. 3, including a misaligned valve pin and the valve pin guidance and alignment system shown in FIGS. 4a–4d, showing the valve pin in an open position with respect to a gate into a mold cavity.

Reference is made to FIG. 6, which shows a portion of the injection molding apparatus 40 that includes an optional gate insert 74 that is positioned in the mold block 24. Throughout the description of embodiment of the invention, components that are similar and have similar functions are provided with the same reference numbers. In this embodiment, the second guidance and alignment structure 62 and the gate 20 are included in the gate insert 74, instead of being directly included in the mold block 24. The gate insert 74 may be made from any suitably thermally conductive material, such as mold steel. The gate insert 74 is thermally conductive to assist in cooling melt contained in the mold cavity 22. Preferably, the gate insert 74 has a thermal conductivity that is higher than that of the seal piece 16c.

In FIG. 6, the nozzle 16 is shown as being made up of several subcomponents. The nozzle 16 includes a nozzle body 16a, a nozzle tip 16b and a seal piece 16c. The nozzle body 16a may have the heater 25 embedded therein in a helical groove. The nozzle body 16a has a first portion 26a of the melt channel 26 therein. The nozzle body 16a may be made from any suitable thermally conductive material, such as steel.

The nozzle tip 16b connects to the nozzle body 16a and has a second portion 26b of the melt passage 26 therein. The nozzle tip 26b may be made from a thermally conductive material such as steel, Beryllium-Copper, Beryllium-free copper such as Ampco 940™, Tungsten Carbide, TZM (Titanium/Zirconium carbide), Aluminum or Aluminum-based alloys, Inconel™, Molybdenum or suitable Molybdenum alloys, H13, mold steel or AerMet 100™ or any other suitable material. By making the nozzle tip 16b as a separate component from the nozzle body 16a, the nozzle tip 16b may be mad from a different material. For example, the nozzle tip 16b may be made from a material that has a higher thermal conductivity than that of the nozzle body 16a. Alternatively, or in addition, the nozzle tip 16b may be made from a material that is more wear resistant than that of the nozzle body 16a.

The nozzle tip 16b may be removably connected to the nozzle body 16a. The removable connection may be made by any suitable means. For example, the nozzle tip 16b may seat within a bore 75 in the nozzle body 16a, and may be retained in place by the seal piece 16c. Because the nozzle tip 16b is removable from the nozzle body 16a, it may be replaced when it is worn, without necessitating the replacement of the entire nozzle body 16a.

The seal piece 16c may connect to the nozzle body 16a by means of a threaded connection between a pair of mating threaded surfaces 76a and 76b on the nozzle body 16a and the seal piece 16c respectively. The seal piece 16c may contact the mold block 24 and form a seal therewith against melt leakage. Alternatively, a seal piece may contact a gate insert 74. Furthermore, the seal piece 16c may align the downstream end of the nozzle 16 with respect to the gate 20.

The seal piece 16c may be made from a less thermally conductive material than that of the nozzle body 16a. For example, the seal piece 16c may be made from titanium, H13, stainless steel, chrome steel or other suitable materials.

The seal piece 16c may include an integral tool engagement portion 73 that facilitate gripping of the seal piece 16c by a tool during removal or installation of the seal piece 16c.

In alternative embodiments, the nozzle body 16a, the nozzle tip 16b and the seal piece 16c may connect together in any way shown in U.S. Pat. Nos. 5,299,928, and 5,421, 716, both of which are hereby incorporated by reference. In addition, reference is made to these two patents for suitable materials of construction for the nozzle body 16a, the nozzle tip 16b and the seal piece 16c.

A chamber 77 may be defined between the seal piece 16c, the nozzle tip 16b and the mold block 24. The chamber 77 is filled with melt during an injection molding operation. Depending on the composition of the melt, it may be advantageous for the melt in the chamber 77 to be maintained in a molten state throughout the injection cycle. By preventing the melt in the chamber from solidifying, the valve pin 42 is ensured to pass only through molten melt instead of solidified melt when it moves through the chamber 77 on its way to or from the gate 20. Passing the valve pin 42 through molten melt subjects the valve pin 42 to less wear than passing the valve pin 42 through solidified melt. Furthermore, molten melt has a reduced likelihood of pushing the valve pin out of alignment than solidified melt.

To ensure that the melt in the chamber 77 is molten when the valve pin 42 moves therethrough, a sufficient surface area of the nozzle tip 16b is present in the chamber 77 to heat the melt therein, and to counteract any cooling effects that may sustained from the mold block 24.

In an alternative embodiment that it not shown, the nozzle tip and the seal piece may each connect to the nozzle body by means of threaded connections. It is also alternatively possible for the seal piece to connect to the nozzle tip, and for the nozzle tip to connect to the nozzle body by some suitable means, such as a threaded connection.

In another embodiment that is not shown, the nozzle tip and the seal piece may both be press-fit into or onto the nozzle body. The press-fit may be suitably tight to maintain the assembly in connection even under injection pressures. Alternatively, the press-fit may be less tight, to facilitate removal when desired, in which case, the components may be held in place by pinning between the mold block and the nozzle.

In the embodiment shown in FIG. 6, the valve pin 42 includes an optional relief channel 78 that extends longitudinally along a portion of the body 46. The function of the relief channel 78 is explained further below.

Figure 7:
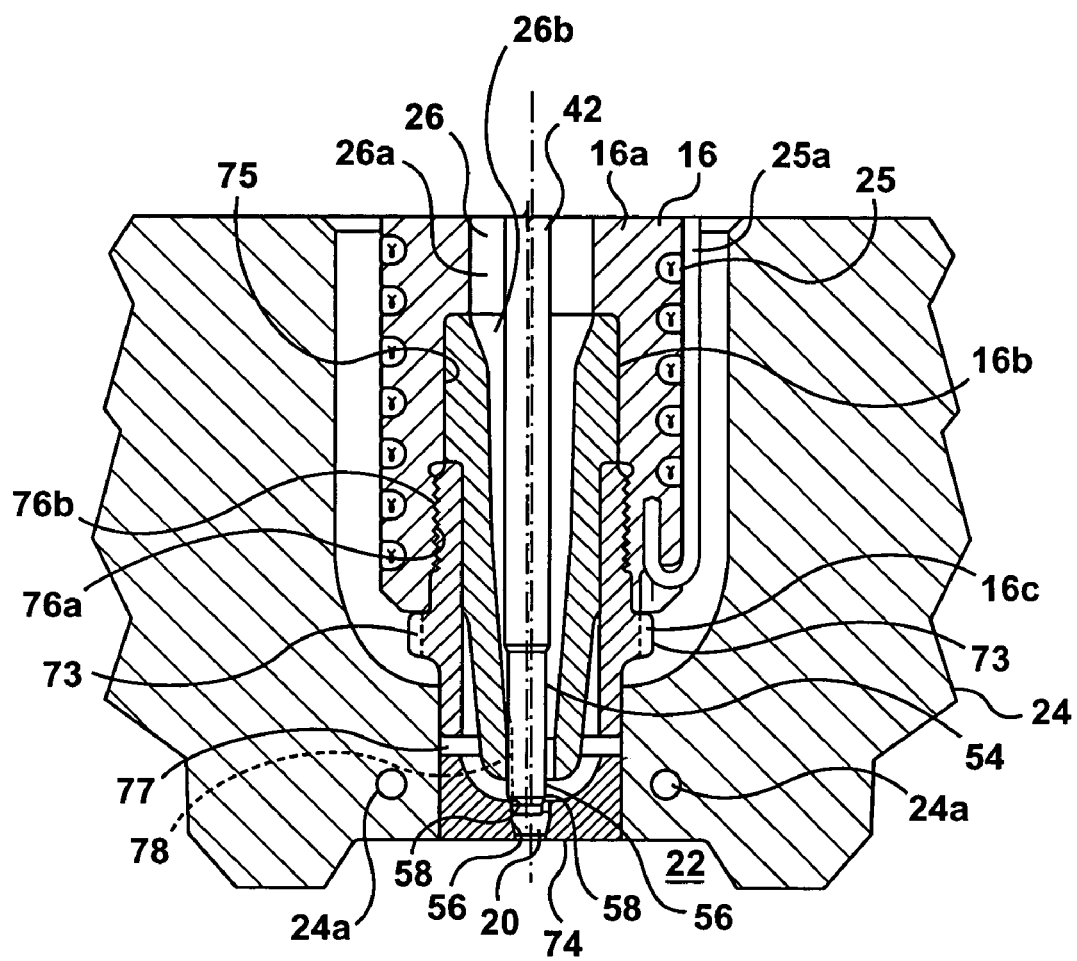
FIG. 7 is a sectional side view of the injection molding apparatus portion shown in FIG. 6 illustrating first contact by the valve pin with a portion of the guidance and alignment system.

In the position shown in FIG. 6, the valve pin 42 is in the open position and is spaced from the gate 20. Referring to FIG. 7, as the valve pin 42 is moved towards the gate 20, if the valve pin 42 is misaligned with respect to the gate 20, the first contact made by the valve pin 42 is between the first guide surface 54 and the second guide surface 58. The valve pin 42 is guided by the cooperation between the first and second guide surfaces 54 and 58, into alignment, and the alignment is maintained by the first and second alignment surfaces 56 and 60, until the valve pin 42 closes the gate 20, as shown in FIG. 8.

Figure 8:
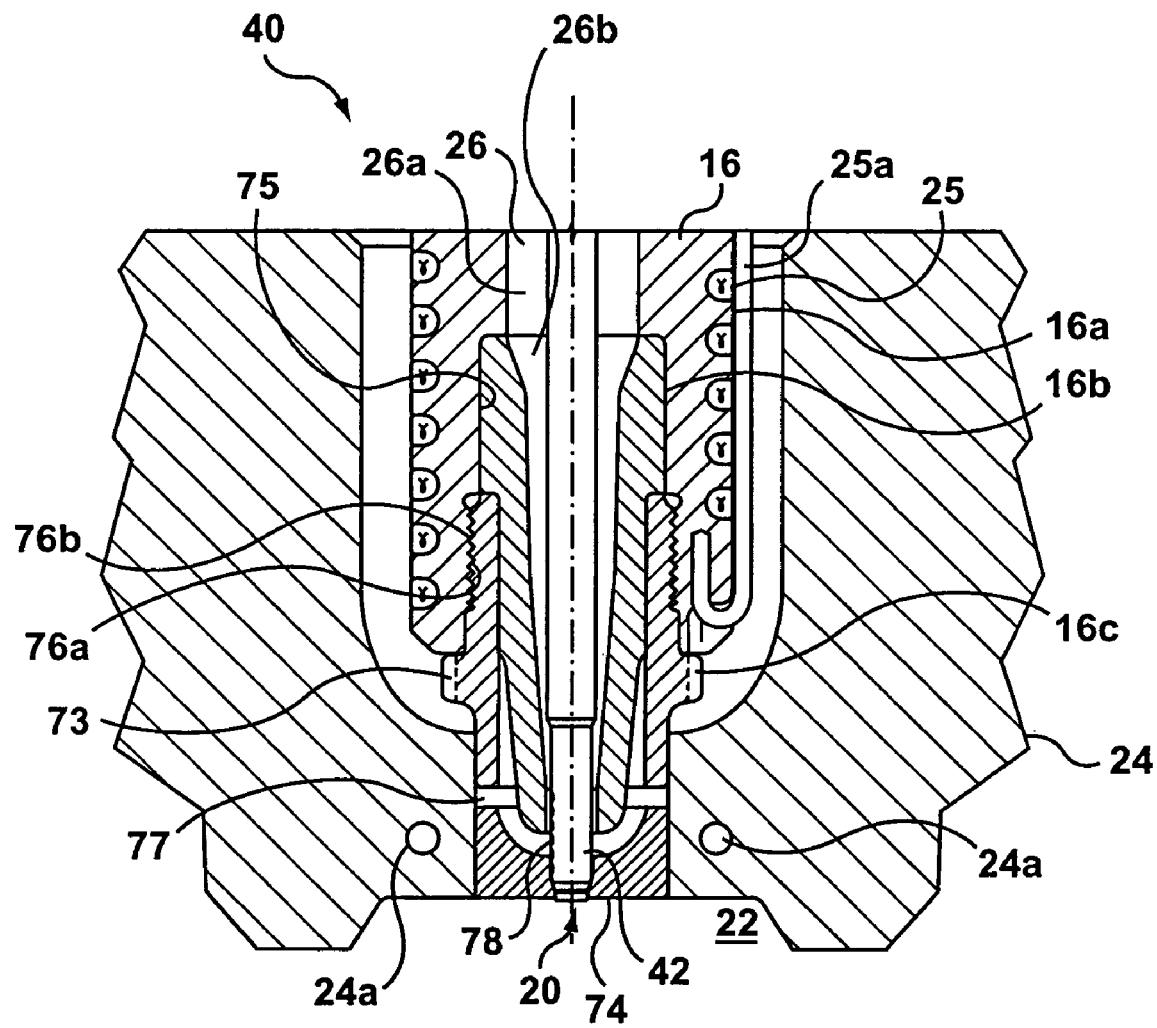
FIG. 8 is a sectional side view of the injection molding apparatus portion shown in FIG. 6, illustrating the valve pin in a closed position with respect to the gate.

As the valve pin 42 approaches the position shown in FIG. 8, the relief channel 78 that is included in the first alignment surface 56 provides a path for the melt that is displaced by the end of the valve pin 42 itself as it moves towards closing the gate 20.

Figure 9:
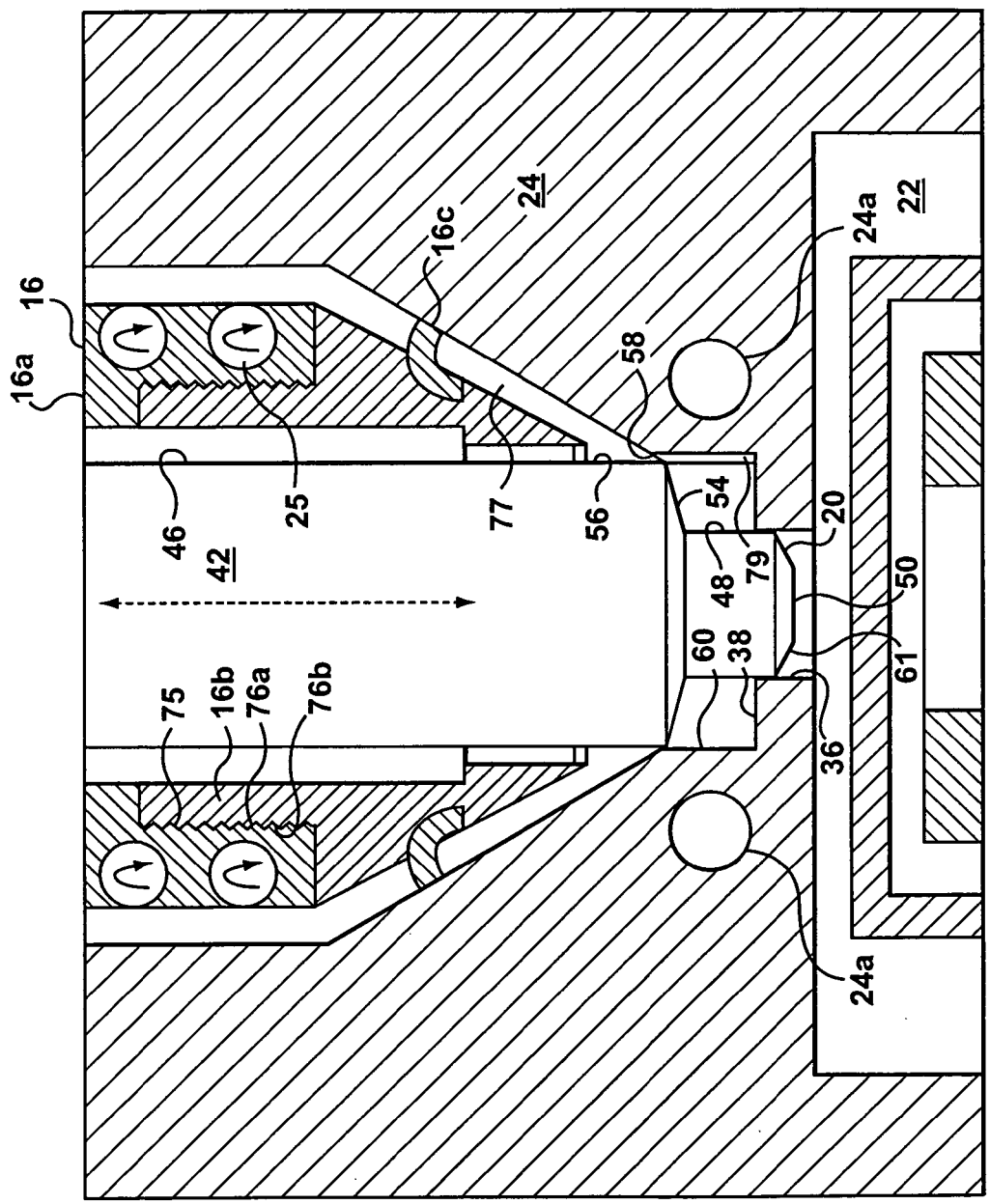
FIG. 9 is a sectional side view of a portion of the injection molding apparatus, showing an optional relief channel that may be included in the valve pin guidance and alignment system.

Referring to FIG. 9, it is alternatively possible for the second alignment surface 60 to include a relief channel 79 instead of the relief channel 78 on the valve pin 42.

An alternative construction for the nozzle body 16a, the nozzle tip 16b and the seal piece 16c is shown in FIG. 9. The bore 75 in the nozzle body 16a shown in FIG. 9 is threaded, for mating with a threaded outer surface of the nozzle tip 16b. The threaded tip 16b may thus connect directly to the nozzle body 16a. The seal piece 16c may mount in any suitable way to the nozzle tip 16b.

Figure 10:
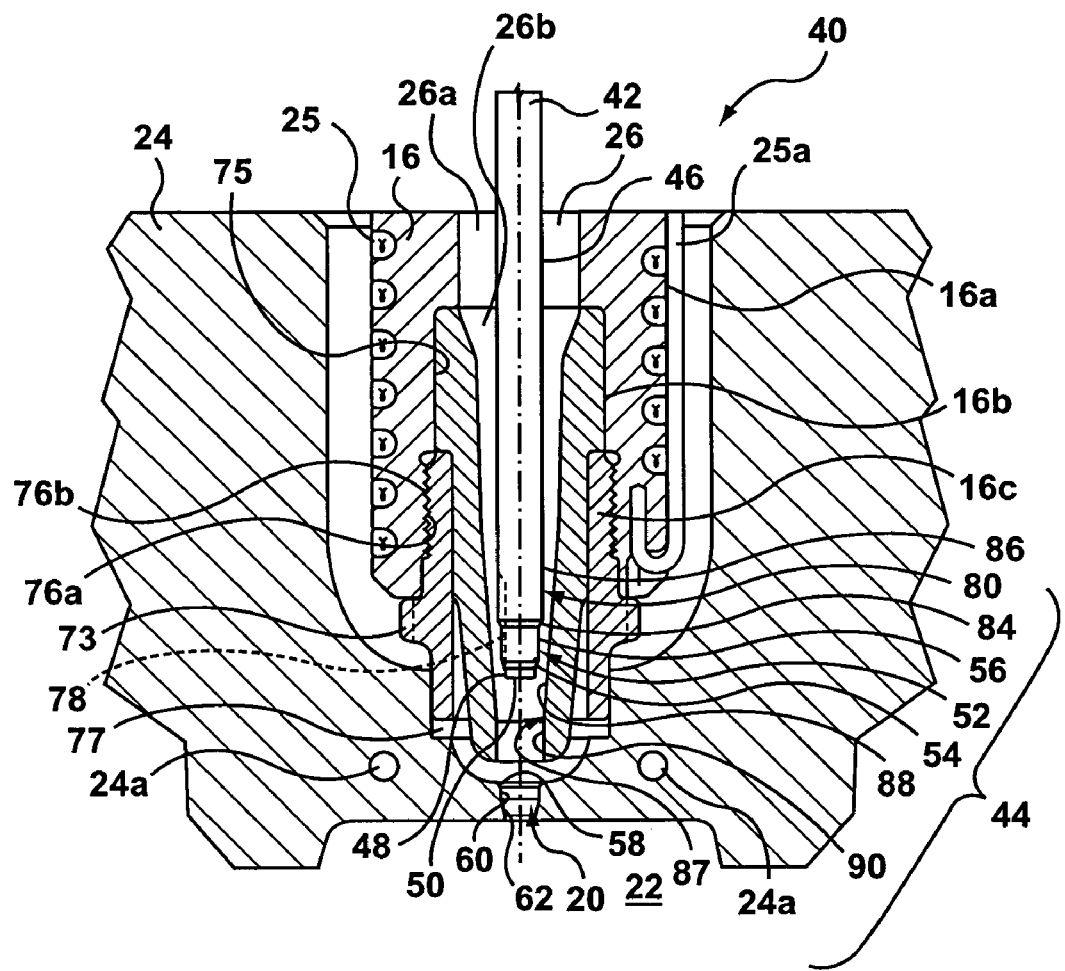
FIG. 10 is a sectional side view of a portion of an injection molding apparatus showing a misaligned valve pin and a valve pin guidance and alignment system in accordance with another alternative embodiment of the present invention, whereby the valve pin is in an open position with respect to a gate into a mold cavity.

Reference is made to FIG. 10, which shows the valve pin guidance and alignment system 44, further comprising optional third and fourth guidance and alignment structures 80 and 87, which cooperate to further align the valve pin 42 with respect to the gate 20.

The third guidance and alignment structure 80 positioned on the valve body 46, upstream from the first structure 52. The term upstream is used in relation to the direction of the melt flow through the nozzle 16. The third structure 80 may be similar to the first structure 52 except that the third structure 80 has a generally larger diameter than the first structure 52. The third structure 80 includes a third guide surface 84 and a third alignment surface 86.

The fourth structure 87 may be similar to the second structure 62 and may include a fourth guide surface 88 and a fourth alignment surface 90. The fourth structure 87 may be positioned anywhere suitable, such as on the nozzle tip 16b.

It is particularly preferable in the embodiment shown in FIG. 10, for the nozzle 16 and more particularly the nozzle tip 16b to be aligned with the gate 20 so that the third and fourth structures 80 and 87 cooperate with the first and second structures 52 and 62 to provide improved alignment of the valve pin 42.

The third and fourth structures 80 and 87 may be integrally included on the valve pin 42 and the nozzle tip 16b, as shown in FIG. 10, or one or both may be separate from the valve pin 42 and the nozzle tip 16b, and may be removably attached thereto.

Figure 11:
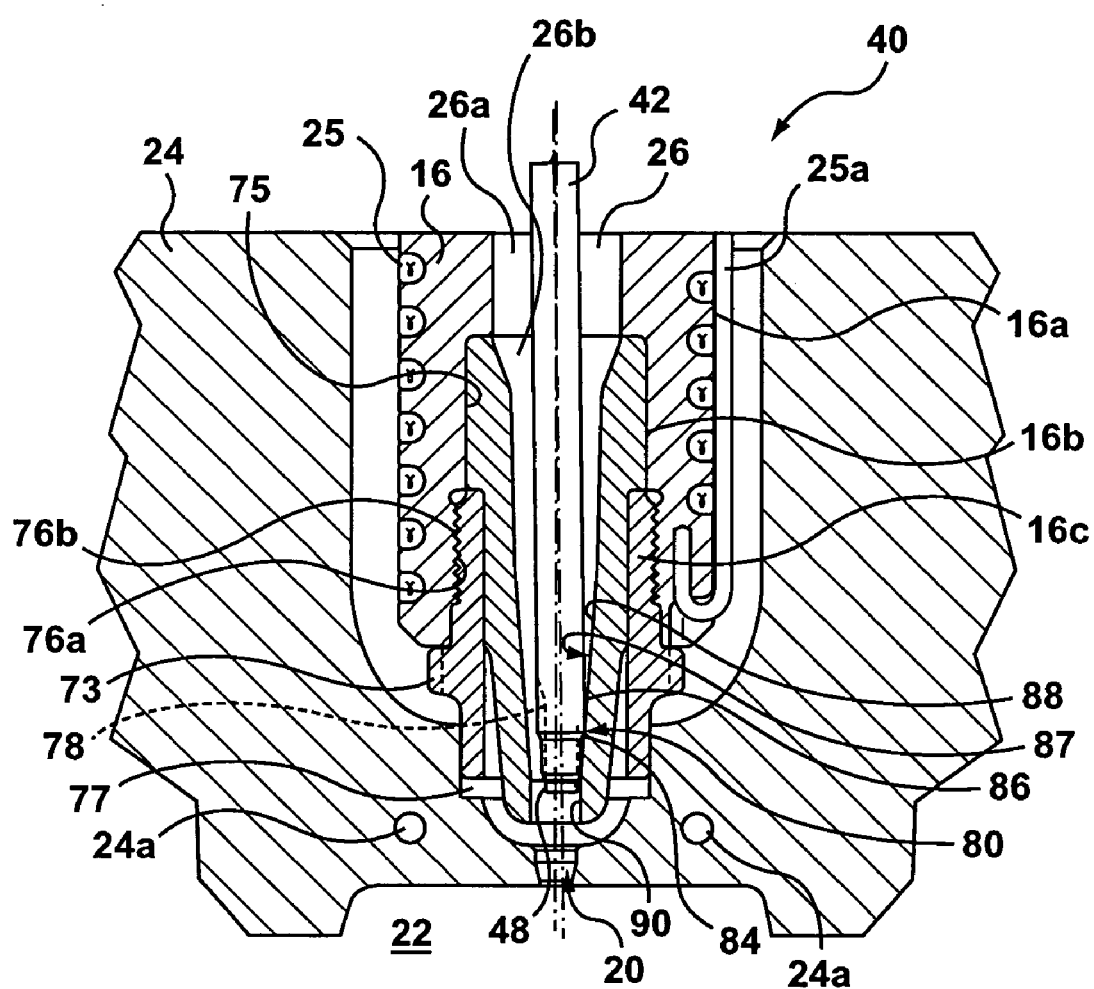
FIG. 11 is a sectional side view of the injection molding apparatus portion shown in FIG. 10, illustrating first contact between the valve pin and a portion of the valve pin guidance and alignment system.

As shown in FIG. 11, if the valve pin 42 is misaligned, the first contact by the valve pin 42 occurs on the guide surface 88 of the fourth structure 87. The guide surface 88 may be angled with a relatively slow taper, to reduce pressure losses in the melt flow through the nozzle tip 16b. Care must be taken to ensure that the third and fourth guide surfaces 84 and 88 cooperate to ensure that other surfaces of the valve pin 42 such as the sealing surface 48, do not contact the nozzle tip 16b.

Figure 12:
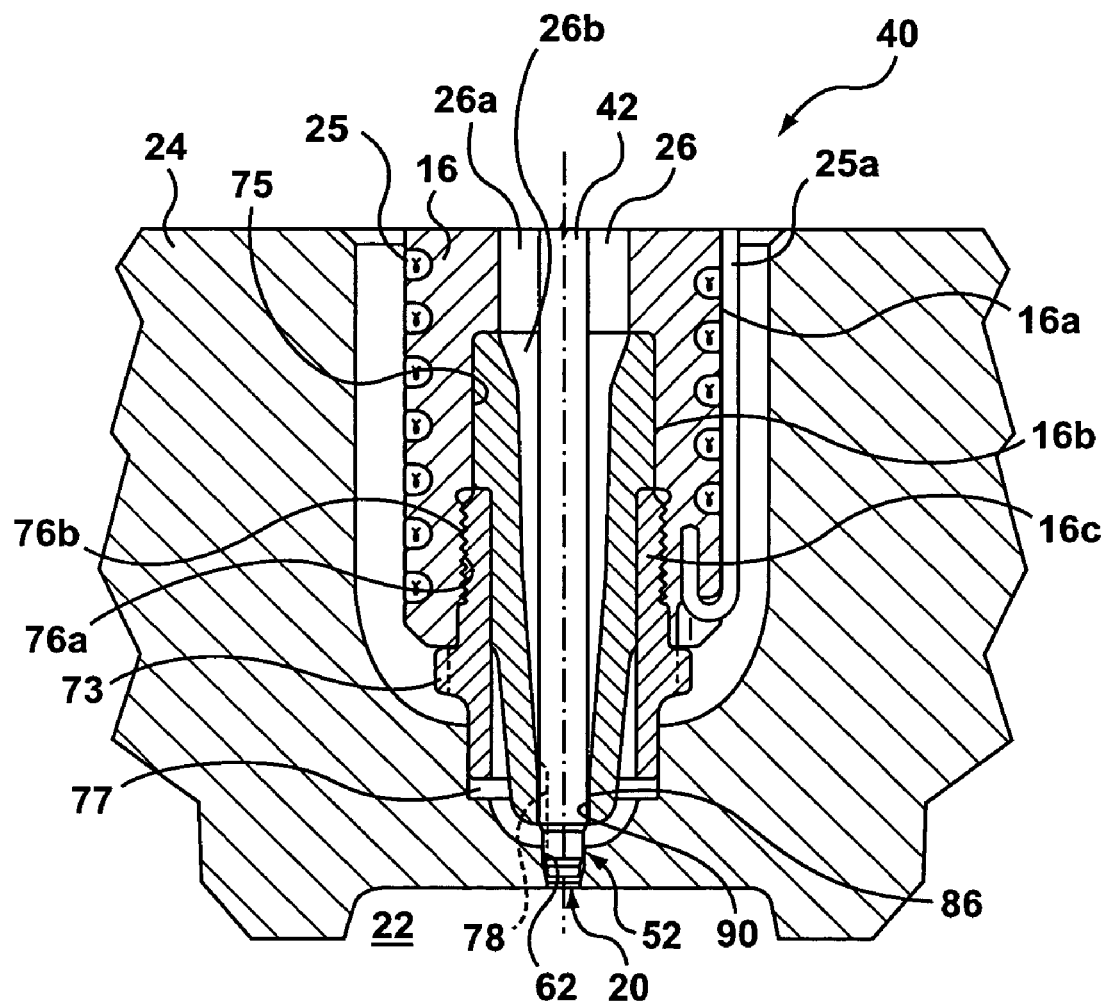
FIG. 12 is a sectional side view of the injection molding apparatus portion shown in FIG. 10, illustrating when the valve pin first contacts another portion of the valve pin guidance and alignment system.
Figure 13:
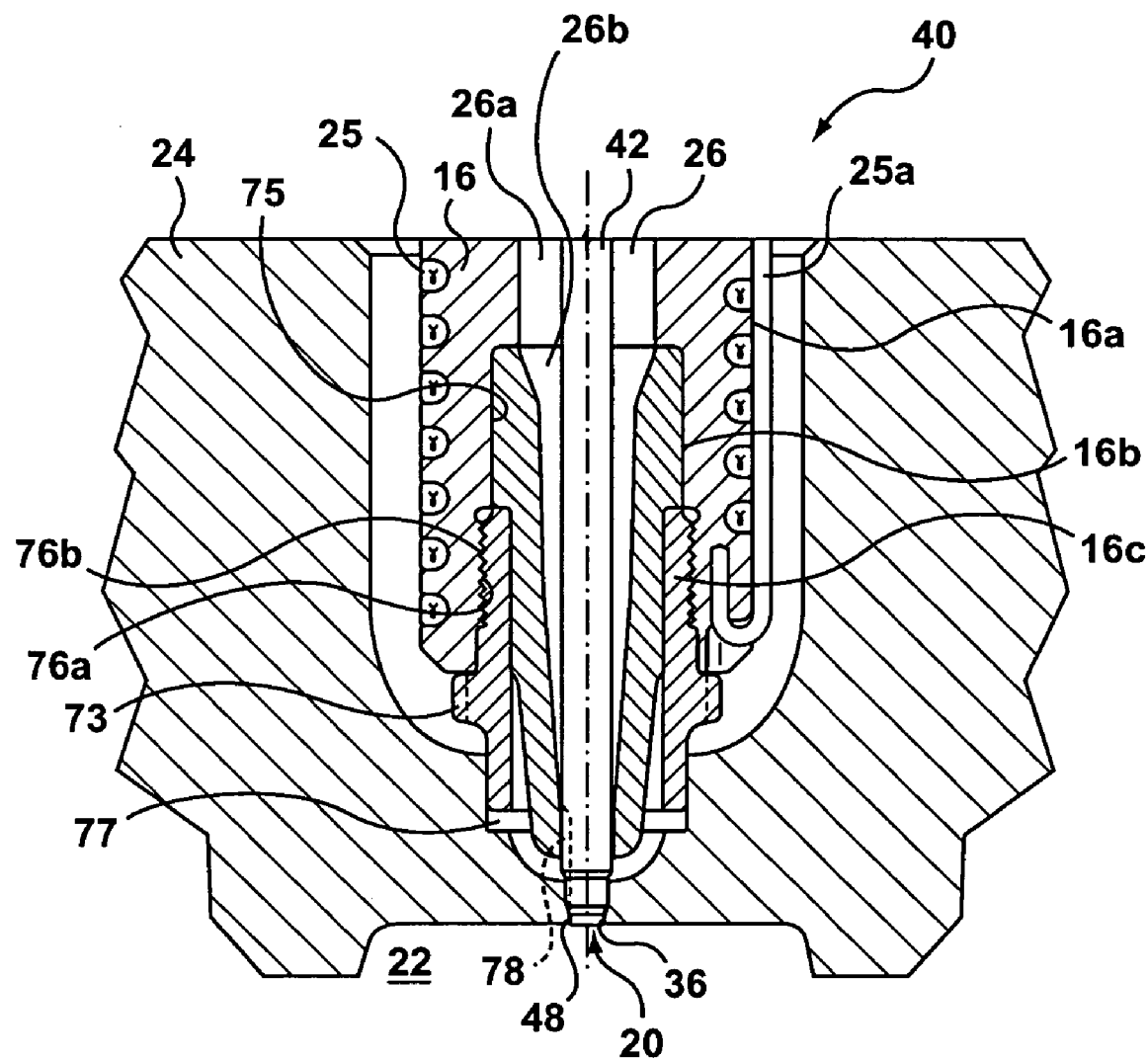
FIG. 13 is a sectional side view of the injection molding apparatus portion shown in FIG. 10, illustrating the valve pin in a closed position with respect to the gate.

After the valve pin 42 is aligned by the cooperation of the third and fourth alignment surfaces 86 and 90, the valve pin 42 next contacts the first and second structures 52 and 62, as shown in FIG. 12. The alignment surfaces 56 and 60 cooperate with the alignment surfaces 86 and 90 so that that the valve pin 42 enters the gate 20 relatively straight and not at an angle with respect to the axis of the gate 20, as shown in FIG. 13. This further reduces the risk of scoring or otherwise damaging the sealing surfaces 36 and 48 on the valve pin 42 and the gate 20.

Figure 14:
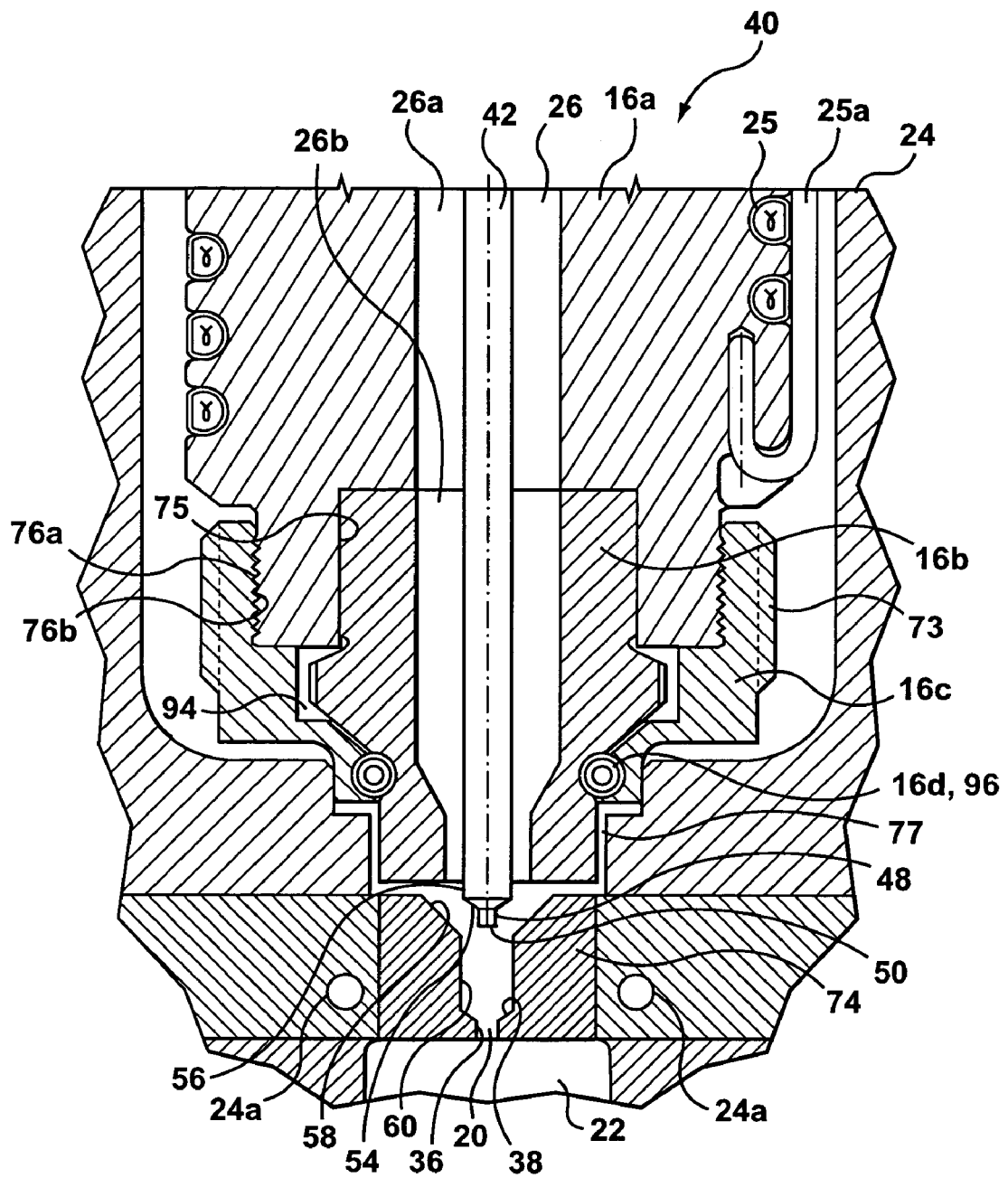
FIG. 14 is a sectional side view of a portion of an injection molding apparatus showing a variant of the nozzle shown in FIGS. 6, 7 and 8.

Reference is made to FIG. 14, which shows a variant of the nozzle 16. In this variant, the nozzle tip 16b is not threaded, and seats in the bore 75 in the nozzle body 16a. The nozzle body 16a has a threaded surface 76a that is externally threaded. The seal piece 16c has an internally threaded surface 76b that mates with the threaded surface 76a.

The seal piece 76c holds the nozzle tip 16a in place in the bore 75, but does not have direct contact with the nozzle tip 16a. Instead, there is provided a second seal piece 16d between the seal piece 16c and the nozzle tip 16b.

The presence of the second seal piece 16d maintains an air gap 94 between the seal piece 16c and the nozzle tip 16b. Because the nozzle tip 16b and the seal piece 16c do not directly contact one another at any point, the overall heat transfer between them is reduced, relative to a configuration where they directly contact each other.

Furthermore, the air gap 94 further reduces the heat transfer between the nozzle tip 16b and the seal piece 16c. Because air has a relatively lower thermal conductivity than melt, the air gap 94 insulates better against heat transfer between the tip 16b and the seal piece 16b, than if the air gap 94 were filled with melt. By reducing the heat losses out of the nozzle tip 16a, the melt therein can more easily be maintained at a controlled temperature prior to injection into the mold cavity 22.

The second seal piece 16d may be an o-ring 96 that is positioned in a first groove in the nozzle tip 16b and a second groove in the seal piece 16c. It is alternatively possible for one of the nozzle tip 16b and the seal piece 16c to contain a sufficiently deep groove to capture the o-ring 96 and the other of the components 16b and 16c to not have a groove at all.

The second seal piece 16d may be made from a material that is suitable for sealing against melt leakage. For example, in the form of the o-ring 72, suitable materials include stainless steels, such as Inconel. The second seal piece 16d may also be made from a material that has a thermal conductivity that is lower than that of the tip 16b, to reduce the heat loss from the tip 16b to the seal piece 16c. More preferably, the second seal piece 16d has a thermal conductivity that is lower than that of the nozzle body 16a. Even more preferably the second seal piece 16d has a thermal conductivity that is lower than that of the seal piece 16c.

The specific cross-sectional shape of the second seal piece 16d has been shown as being generally circular, however, other cross-sectional shapes may be used.

The guidance and alignment surfaces 54, 58, 58 and 60 and the sealing surfaces 36 and 48 operate in a manner similar to that described with respect to the embodiment of FIGS. 6–8.

Figure 15:
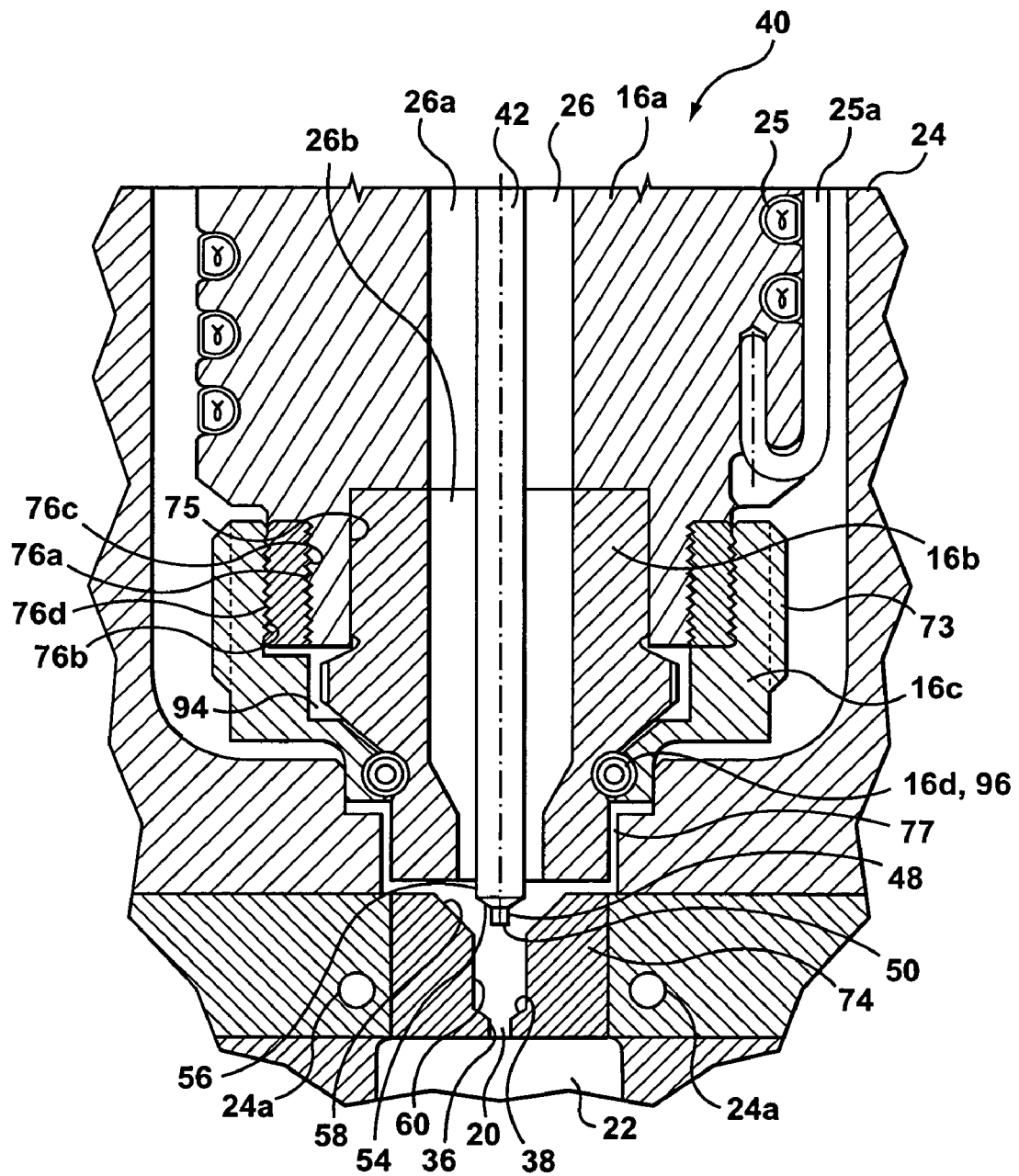
FIG. 15 is a sectional side view of a portion of an injection molding apparatus showing another variant of the nozzle shown in FIGS. 6, 7 and 8.

Reference is made to FIG. 15, which shows another variant of the nozzle 16 that is similar to the variant shown in FIG. 14. In the variant of FIG. 15, however, the internally threaded surface 76b of the seal piece 16c mates with an externally threaded surface 76c on an insulator piece 16e. The insulator piece 16e may also have an internally threaded surface 76d that mates with the externally threaded surface 76a of the nozzle body 16a.

The optional insulator piece 16e is attached to the nozzle body 82 and receives the tip surrounding piece 86. The insulator piece 16e may be made from a material having a relatively lower thermal conductivity than that of the seal piece 16c, to reduce the overall thermal conductivity of the path from the nozzle body 16a, through the insulator piece 16e, in turn through the seal piece 16c, and into the mold component 24.

By having the insulator piece 16e between the seal piece 16c and the nozzle body 16a, the seal piece 16c may be made from a material having any desired wear resistance, with less regard to whether it has a relatively high or low thermal conductivity relative to that of the nozzle body 16a.

The guidance and alignment surfaces 54, 56, 58 and 60 and the sealing surfaces 36 and 48 operate in a manner similar to that described with respect to the embodiment of FIGS. 6–8.

Figure 16:
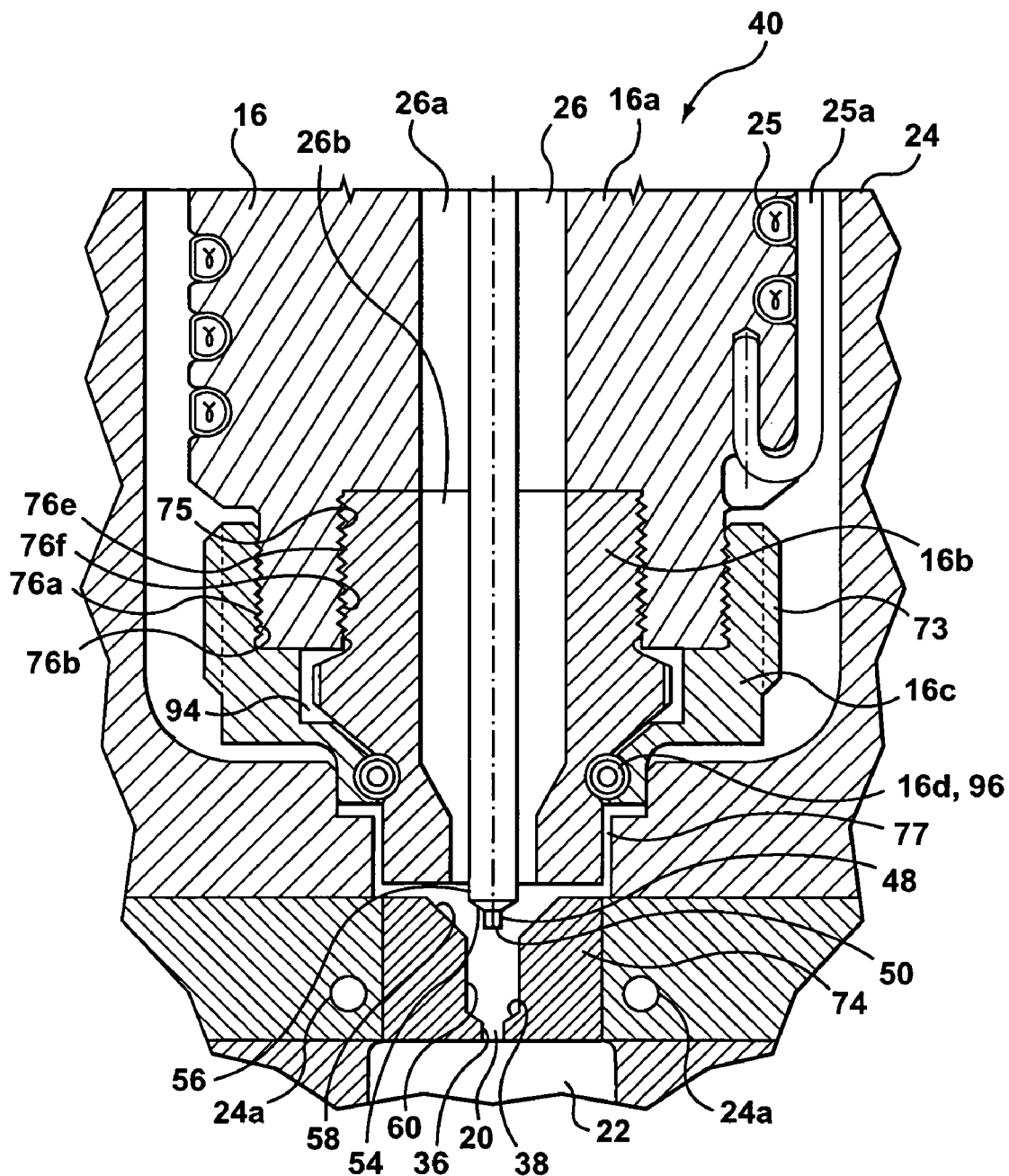
FIG. 16 is a sectional side view of a portion of an injection molding apparatus showing yet another variant of the nozzle shown in FIGS. 6, 7 and 8.

Reference is made to FIG. 16, which shows yet another variant of the nozzle 16 that is similar to the variant shown in FIG. 14. In the variant of FIG. 16, however, the bore 75 in the-nozzle body 16a has a threaded portion 76e that mates with a corresponding threaded surface 76f on the nozzle tip 16b. The seal piece 16d in this embodiment also has the internally threaded surface 76b that mates with the externally threaded surface 76a of the nozzle body 16a.

The guidance and alignment surfaces 54, 56, 58 and 60 and the sealing surfaces 36 and 48 operate in a manner similar to that described with respect to the embodiment of FIGS. 6–8.

A particular example of an injection molding apparatus is shown in the FIGS. It will be appreciated that the injection molding apparatus may be any suitable type of injection molding apparatus. Furthermore, the injection molding apparatus may have as little as one runner, or may have more runners, and may have as little as one mold cavity or may have more mold cavities. Furthermore, each mold cavity may be provided with more than one gate. Also, more than one material may be transferred simultaneously through the injection molding apparatus and into each mold cavity, for example, when making molded articles that have multiple layers of different materials.

Figure 19A:
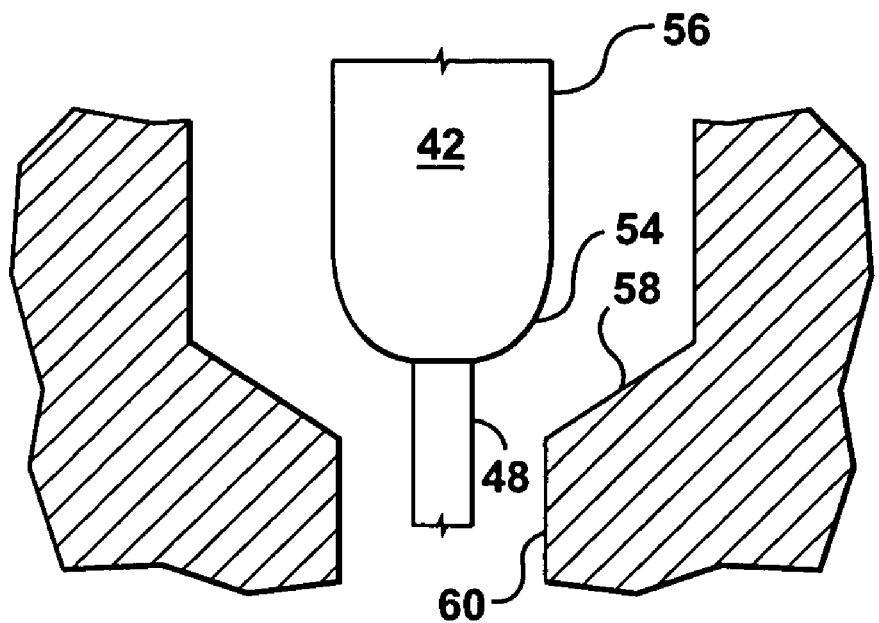
FIGS. 19a and 19b are magnified side views of a variant of a portion of a guidance and alignment structure shown in FIGS. 4a–4d.

In the embodiments described above, the first and second guide surfaces have been described as being frusto-conical, however, it will be appreciated that other shapes of surface are suitable. For example, the first and second guide surfaces may be arcuate in profile (see FIGS. 19a and 19b). As shown in FIG. 19a, the first guide surface 54 may curve gradually into the first alignment surface 56. The gradual curve eliminates the corner edge that exists between the first guide surface 54 and the first alignment surface 56 in the embodiments shown in FIGS. 3–16. The gradual curve thus eliminates a potential source of damage to the valve pin and the second guidance and alignment structure.

Figure 19B:
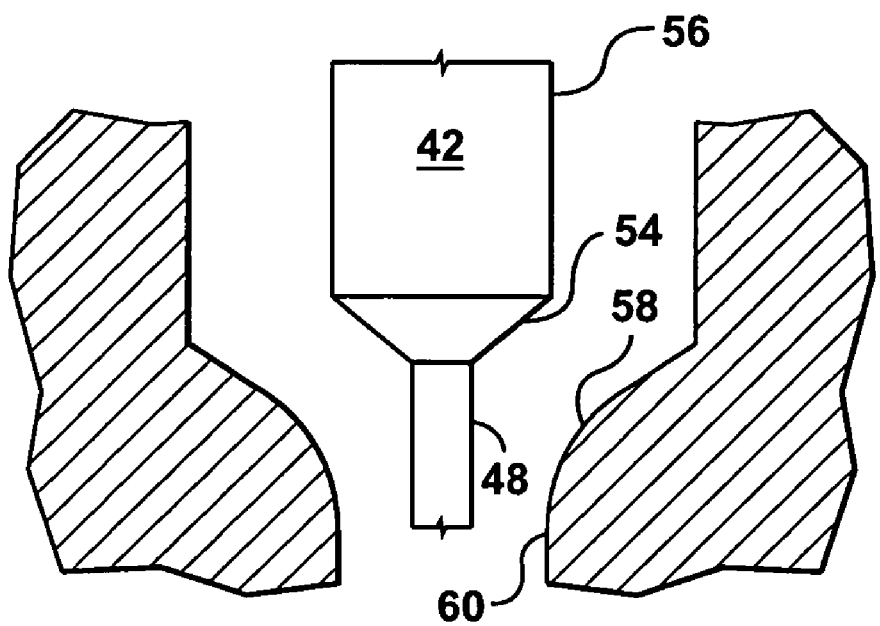

As shown in FIG. 19b, the second guide surface 58 may gradually curve into the second alignment surface 60, thereby eliminating a corner edge that exists in the embodiments shown in FIGS. 3–16. The gradual curve thus eliminates a potential source of damage. As a further alternative, a gradual curve may be applied between the first surfaces 54 and 56 and the second surfaces 58 and 60.

Figure 5:
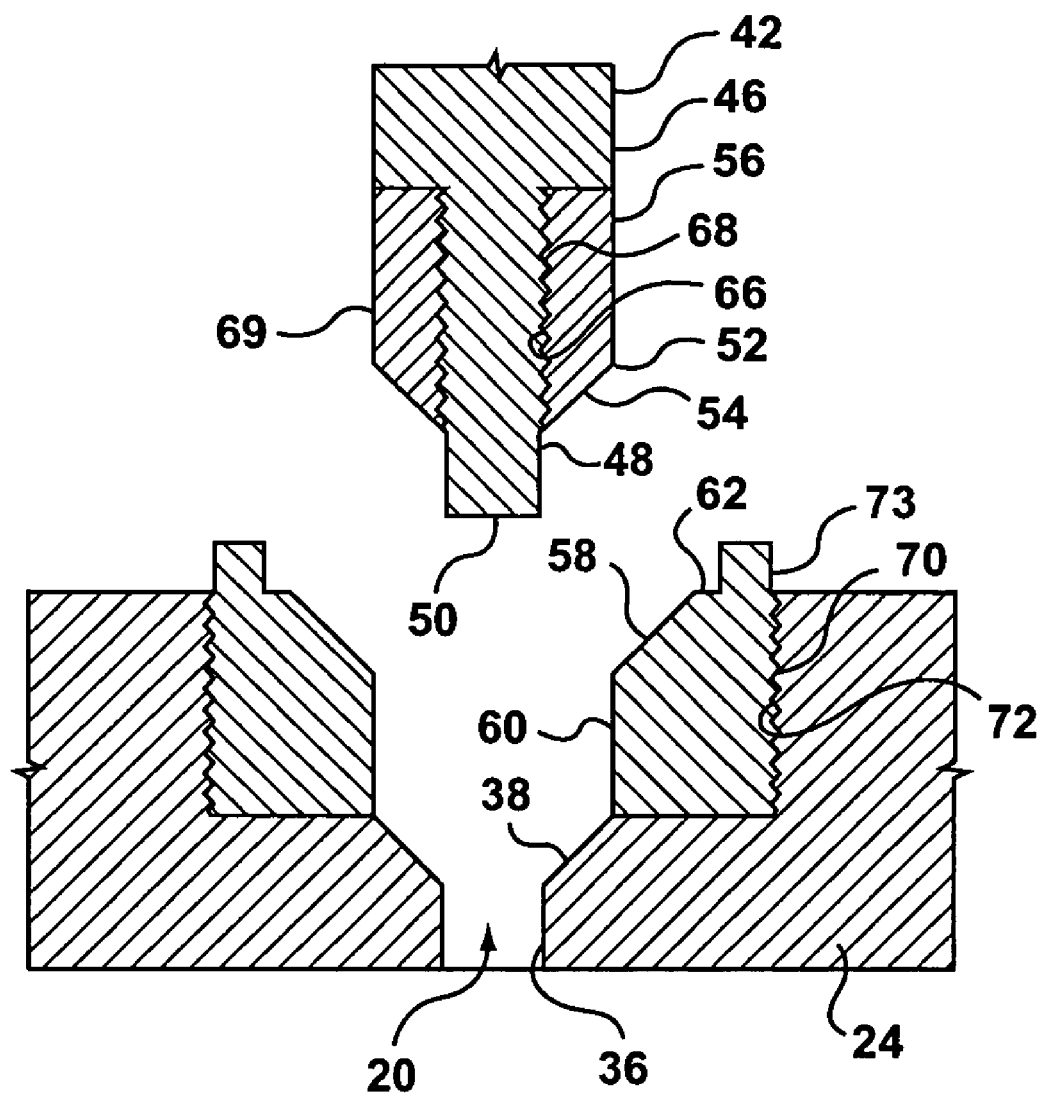
FIG. 5 is a magnified sectional side view of a valve pin guidance and alignment system in accordance with an alternative embodiment of the present invention.
Figure 20:
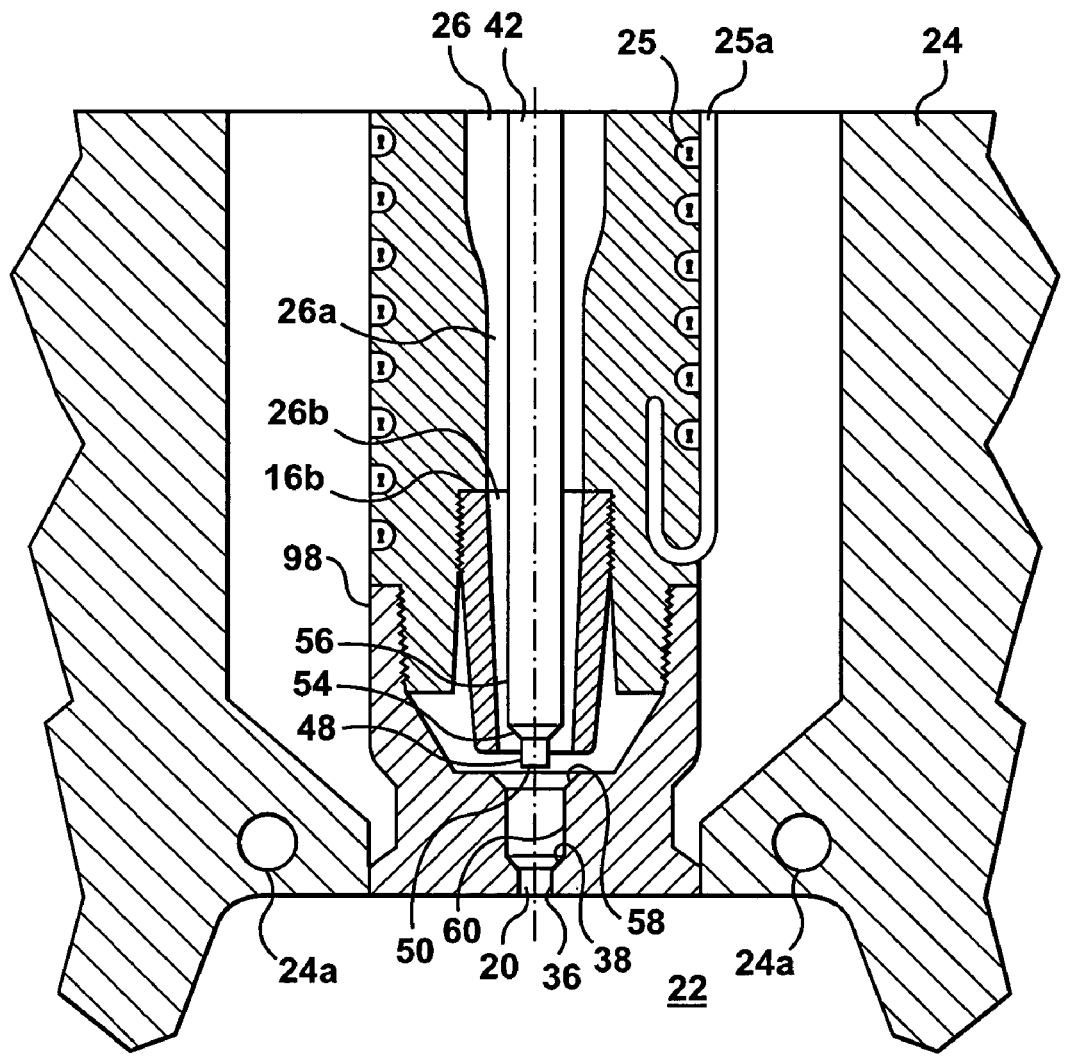
FIG. 20 is a sectional side view of a portion of an injection molding apparatus showing yet another variant of the nozzle shown in FIGS. 6, 7 and 8.

In some embodiments described above, the second guidance and alignment structure is integrally included in the mold block, while in others the second guidance and alignment structure is included in a separate gate insert, in a separate piece that mounts removably from the mold block 24 and is separate from the gate (see FIG. 5 and 6). It is within the scope of the invention for the mold block in any of the embodiments described above, to optionally include any structure, which may be removable or fixedly mounted therein, that could have the second guidance and alignment structure defined therein, or to have the second guidance and alignment structure defined integrally directly in the mold block. Referring to FIG. 20, the gate 20 may, for example, be defined in a gate insert 98 that is connected to both the nozzle body 16a and the mold block 24. In the embodiment shown in FIG. 20, the gate insert 98 replaces the seal piece provided in the embodiments in FIGS. 3–16. In this embodiment, the second guide surface 58 and the second alignment surface 60 are positioned upstream from the gate 20 in the gate insert 98. The gate insert 98 is connected to the nozzle body 16a by means of a threaded connection. The gate insert 98 may connect to an outer surface of the nozzle body 16a, as shown in FIG. 20. In any alternative embodiment that is not shown, the gate insert may connect to an internal bore in the nozzle body.

In the embodiments described, the nozzle included a nozzle body and a nozzle tip that are thermally conductive and a seal piece that is less thermally conductive, and that is connected directly to the nozzle body and/or the nozzle tip. It is alternatively possible for the seal piece to be connected to another component that attaches to the nozzle body or nozzle tip. This other component may itself be made from a thermally conductive material if desired since it is not in direct contact with the mold block 24.

While the above description constitutes the preferred embodiments, it will be appreciated that the present invention is susceptible to modification and change without departing from the fair meaning of the accompanying claims.

What is claimed is:

1. An injection molding apparatus, comprising:
   a manifold having a manifold outlet;
   a nozzle defining a nozzle melt channel downstream from said manifold outlet, wherein said nozzle includes a nozzle body, a nozzle tip, and a seal piece, wherein said nozzle tip is removable from said nozzle body and wherein said nozzle tip defines a portion of said nozzle melt channel;
   a mold block defining a gate downstream from said nozzle melt channel, wherein said gate includes a gate sealing surface, wherein said seal piece engages said mold block, wherein a chamber is defined by said mold block, said nozzle tip and said seal piece and wherein said nozzle tip has sufficient surface area in said chamber to maintain melt in said chamber in a substantially molten state; and
   a valve pin movable into and out of said gate having a valve pin sealing surface engageable with said gate sealing surface;
   said valve pin having a first guidance and alignment structure upstream from said valve pin sealing surface including a first guide surface and a first alignment surface, wherein said first guide surface has a cross-sectional diameter that decreases gradually in a downstream direction, and wherein said first alignment surface is generally cylindrical and said first guide surface is positioned immediately downstream from said first alignment surface; and
   said mold block having a second guidance and alignment structure upstream from said gate sealing surface including a second guide surface and a second alignment surface, wherein said second guide surface has a diameter that decreases gradually in a downstream direction, and wherein said second alignment surface is generally cylindrical and said second guide surface is positioned immediately upstream from said second alignment surface,
   wherein, during movement of said valve pin towards said gate, said second guide surface engages said first guide surface, said first alignment surface slides into alignment with said second alignment surface, said first alignment surface slides along said second alignment surface and said valve pin sealing surface is positioned in alignment with said gate sealing surface.

2. An injection molding apparatus as claimed in claim 1, wherein said first guidance and alignment structure includes a relief channel that extends along at least a portion of said first guide surface and at least a portion of said first alignment surface.

3. An injection molding apparatus as claimed in claim 1, wherein said second guidance and alignment structure includes a relief channel that extends along at least a portion of said second guide surface and at least a portion of said second alignment surface.

4. An injection molding apparatus as claimed in claim 1, wherein:
said valve pin has a third guidance and alignment structure including a third guide surface and a third alignment surface upstream from said first guidance and alignment structure, wherein said third guide surface has a cross-sectional diameter that decreases gradually in a downstream direction, and wherein said third alignment surface is generally cylindrical and said third guide surface is positioned immediately downstream from said third alignment surface and is upstream from said first alignment surface; and
said nozzle tip has a fourth guidance and alignment structure including a fourth guide surface and a fourth alignment surface, wherein said fourth guide surface has a diameter that decreases gradually in a downstream direction, and wherein said fourth alignment surface is generally cylindrical and said fourth guide surface is positioned immediately upstream from said fourth alignment surface and said fourth alignment surface is upstream from said second guide surface,
wherein, during movement of said valve pin towards said gate, said fourth guide surface engages said third guide surface, said third alignment surface slides into alignment with said fourth alignment surface, said third alignment surface slides along said fourth alignment surface and said valve pin is generally positioned in alignment with said gate.

5. An injection molding apparatus as claimed in claim 1, wherein said nozzle tip is retained in said nozzle body by said seal piece.

6. An injection molding apparatus as claimed in claim 1, wherein said nozzle tip is connected to said nozzle body by a threaded connection.

7. An injection molding apparatus as claimed in claim 1, wherein said seal piece is a first seal piece, and said nozzle further includes a second seal piece disposed between said first seal piece and said nozzle tip such that said first seal piece, said second seal piece, said nozzle body and said nozzle tip define an insulating airspace.

8. An injection molding apparatus as claimed in claim 1, wherein said first guidance and alignment structure is removably connected to said valve pin.

9. An injection molding apparatus as claimed in claim 1, wherein said second guidance and alignment structure is removably connected to said mold block.

10. An injection molding apparatus as claimed in claim 1, wherein said second guidance and alignment structure is positioned in a gate insert that contains said gate and is removably connected to said mold block.

11. An injection molding apparatus as claimed in claim 1, wherein said first guide surface curves gradually into said first alignment surface.

12. An injection molding apparatus as claimed in claim 1, wherein said second guide surface curves gradually into said second alignment surface.

13. An injection molding apparatus as claimed in claim 1, wherein said gate and said second guidance and alignment structure are defined in a gate insert that is removably connected to said nozzle body.

14. An injection molding apparatus as claimed in claim 1, wherein said manifold has an inlet and a plurality of said manifold outlets, and has a plurality of runners downstream from said inlet and upstream from said plurality of manifold outlets, and wherein said injection molding apparatus includes a plurality of said nozzles, wherein each nozzle is downstream from one of said plurality of manifold outlets, wherein said mold block defines a plurality of gates, and wherein said mold block, said nozzle tip and said seal piece on each of said plurality of nozzles define said chamber, and wherein each of said plurality of nozzles includes said valve pin.

15. An injection molding apparatus comprising:
a nozzle body having a melt channel, said nozzle body being made of a first material;
a valve pin at least partially positioned in the melt channel, said valve pin having
a first guidance and alignment structure thereon;
a nozzle tip in thermal contact with the nozzle body;
a seal piece in thermal contact with the nozzle tip and the nozzle body; and
a mold gate insert having a gate, said mold gate insert being in contact with the seal piece;
wherein the nozzle tip is made of a second material having a higher thermal conductivity than said first material,
wherein the seal piece is made of a third material having a lower thermal conductivity than said first material,
wherein the mold gate insert is made of a fourth material having a higher thermal conductivity than said third material, and
wherein the mold gate insert includes a second guidance and alignment structure that contacts the first guidance and alignment structure before the valve pin contacts the gate during movement of said valve pin towards said gate.

16. An injection molding apparatus as claimed in claim 15, wherein the nozzle tip has a nozzle tip guidance and alignment structure that contacts the first guidance and alignment during movement of the valve pin towards the gate orifice.

17. An injection molding apparatus as claimed in claim 15, wherein the nozzle tip is threaded to the nozzle body.

18. An injection molding apparatus as claimed in claim 15, wherein the seal piece is threaded to the nozzle body.

19. An injection molding apparatus as claimed in claim 15, wherein the seal piece retains the nozzle tip.

20. An injection molding apparatus as claimed in claim 15, wherein the first guidance and alignment structure of the valve pin is removably connected to said valve pin.

21. An injection molding apparatus as claimed in claim 15, wherein said gate insert is removably connected to said nozzle body.

22. An injection molding apparatus as claimed in claim 1, wherein the thermal conductivity of said nozzle tip is higher than the thermal conductivity of said nozzle body, and wherein the thermal conductivity of said seal piece is lower than the thermal conductivity of said nozzle body.

23. An injection molding apparatus comprising:
a nozzle body having a melt channel;
a valve pin including a first guidance and alignment structure, a second guidance and alignment structure downstream from said first guidance and alignment structure and a first sealing surface downstream from said second guidance and alignment structure;

a nozzle tip in thermal contact with the nozzle body and including a third guidance and alignment structure;

a seal piece in thermal contact with the nozzle tip and the nozzle body; and a mold plate defining a gate, wherein said mold plate includes a fourth guidance and alignment structure and a second sealing surface downstream from said fourth guidance and alignment structure;

wherein said first guidance and alignment structure of said valve pin is capable of interacting with said third guidance and alignment structure of said nozzle tip and said second guidance and alignment structure of said valve pin is capable of interacting with said fourth guidance and alignment structure of said mold plate, wherein said first sealing surface contacts said second sealing surface without contacting any other surfaces of said nozzle tip or said mold plate.

24. The injection molding apparatus of claim 23, wherein said mold plate includes a gate insert defining said gate, said fourth guidance and alignment structure and said sealing surface.

25. The injection molding apparatus of claim 24, wherein said gate insert contacts said seal piece.

26. The injection molding apparatus of claim 24, wherein said gate insert is in thermal contact with said nozzle body.

27. The injection molding apparatus of claim 24, wherein said seal piece is a first material and said gate insert is a second material having a higher thermal conductivity than said first material.

28. The injection molding apparatus of claim 23, wherein said seal piece is a first material, said nozzle body is a second material having a thermal conductivity that is higher than said second material, and said nozzle tip is a third material having a higher thermal conductivity than said second material.

29. The injection molding apparatus of claim 1, wherein one of said seal piece and said nozzle tip is removably connected to said nozzle body.

30. The injection molding apparatus of claim 1, wherein said mold block includes a gate insert defining said gate.

31. The injection molding apparatus of claim 30, wherein said chamber is defined by said mold block, said gate insert, said nozzle tip and said seal piece.

32. The injection molding apparatus of claim 15, wherein said nozzle tip is in guiding contact with said valve pin during movement of said valve pin towards said gate.

33. An injection molding apparatus, comprising:
a manifold having a manifold outlet;
a nozzle defining a nozzle melt channel downstream from said manifold outlet, wherein said nozzle includes a nozzle body, a nozzle tip, and a seal piece, wherein said nozzle tip is removable from said nozzle body and wherein said nozzle tip defines a portion of said nozzle melt channel;
a mold block including a gate insert that defines a gate downstream from said nozzle melt channel and includes a gate sealing surface, wherein said seal piece and said gate insert engage said mold block within a common bore in said mold block; and
a valve pin having a valve pin sealing surface engageable with said gate sealing surface.

34. The injection molding apparatus of claim 33, wherein said valve pin has a first guidance and alignment structure upstream from said valve pin sealing surface including a first guide surface and a first alignment surface, wherein said first guide surface has a cross-sectional diameter that decreases gradually in a downstream direction, and wherein said first alignment surface is generally cylindrical and said first guide surface is positioned immediately downstream from said first alignment surface; and said mold block has a second guidance and alignment structure upstream from said gate sealing surface including a second guide surface and a second alignment surface, wherein said second guide surface has a diameter that decreases gradually in a downstream direction, and wherein said second alignment surface is generally cylindrical and said second guide surface is positioned immediately upstream from said second alignment surface, wherein, during movement of said valve pin towards said gate, said second guide surface engages said first guide surface, said first alignment surface slides into alignment with said second alignment surface, said first alignment surface slides along said second alignment surface and said valve pin sealing surface is positioned in alignment with said gate sealing surface.

35. An injection molding apparatus as claimed in claim 34, wherein:
said valve pin has a third guidance and alignment structure upstream from said first guidance and alignment structure including a third guide surface and a third alignment surface, wherein said third guide surface has a cross-sectional diameter that decreases gradually in a downstream direction, and wherein said third alignment surface is generally cylindrical and said third guide surface is positioned immediately downstream from said third alignment surface and is upstream from said first alignment surface; and said nozzle tip has a fourth guidance and alignment structure including a fourth guide surface and a fourth alignment surface, wherein said fourth guide surface has a diameter that decreases gradually in a downstream direction, and wherein said fourth alignment surface is generally cylindrical and said fourth guide surface is positioned immediately upstream from said fourth alignment surface and said fourth alignment surface is upstream from said second guide surface, wherein, during movement of said valve pin towards said gate, said fourth guide surface engages said third guide surface, said third alignment surface slides into alignment with said fourth alignment surface, said third alignment surface slides along said fourth alignment surface and said valve pin is generally positioned in alignment with said gate.

* * * * *